United States Patent
Lee et al.

(10) Patent No.: US 10,749,672 B2
(45) Date of Patent: Aug. 18, 2020

(54) COMPUTING SYSTEM HAVING AN ON-THE-FLY ENCRYPTOR AND AN OPERATING METHOD THEREOF

(71) Applicant: SAMSUNG ELECTRONICS CO., LTD., Suwon-si, Gyeonggi-Do (KR)

(72) Inventors: Heonsoo Lee, Hwaseong-si (KR); Jaechul Park, Seoul (KR); Jonghoon Shin, Hwaseong-si (KR); Youngjin Chung, Seongnam-si (KR); Hong-Mook Choi, Bucheon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 147 days.

(21) Appl. No.: 15/585,253

(22) Filed: May 3, 2017

(65) Prior Publication Data
US 2017/0346628 A1 Nov. 30, 2017

(30) Foreign Application Priority Data

| May 30, 2016 | (KR) | 10-2016-0066143 |
| Jul. 22, 2016 | (KR) | 10-2016-0093582 |
| Nov. 1, 2016 | (KR) | 10-2016-0144663 |

(51) Int. Cl.
*H04L 9/08* (2006.01)
*G06F 12/06* (2006.01)
(Continued)

(52) U.S. Cl.
CPC .......... *H04L 9/0861* (2013.01); *G06F 12/063* (2013.01); *G06F 12/1408* (2013.01);
(Continued)

(58) Field of Classification Search
None
See application file for complete search history.

(56) References Cited

U.S. PATENT DOCUMENTS 6,226,736 B1 * 5/2001 Niot .................. G06F 9/3802
710/66
6,272,637 B1 * 8/2001 Little ............... G06F 12/1408
380/52
(Continued)

FOREIGN PATENT DOCUMENTS

| EP | 1801725 | 6/2007 |
| JP | 2007122391 | 5/2007 |
| WO | 2015052084 | 4/2015 |

OTHER PUBLICATIONS

Suh, G. Edward, et al., "Efficient Memory Integrity Verification and Encryption for Secure Processors", MIT Computer Science and Artificial Intelligence Laboratory Cambridge, MA 02139, USA, Proceedings of the 36th International Symposium on Microarchitecture (MICRO-36 2003), pp. 1-12.

*Primary Examiner* — Nasser M Goodarzi
*Assistant Examiner* — Adil Ocak
(74) *Attorney, Agent, or Firm* — F. Chau & Associates, LLC

(57) ABSTRACT

A path for transmitting encrypted data is completely separated from a path for transmitting unencrypted data. To this end, a virtual secure memory is created on an address space. If a central processing unit (CPU) writes data in the virtual secure memory, hardware stores the data in a specific area of a dynamic random access memory (DRAM) after automatically encrypting the data. In the case where the CPU intents to read data, the hardware sends the data to the CPU after automatically decrypting the data read from a specific area of the DRAM.

20 Claims, 27 Drawing Sheets

(51) Int. Cl.
*G06F 13/40* (2006.01)
*G06F 21/78* (2013.01)
*G06F 12/14* (2006.01)

(52) U.S. Cl.
CPC .............. *G06F 13/40* (2013.01); *G06F 21/78* (2013.01); *H04L 9/0838* (2013.01); *G06F 13/404* (2013.01); *G06F 2212/1052* (2013.01)

(56) References Cited

U.S. PATENT DOCUMENTS

| | | | |
|---|---|---|---|
| 6,772,955 B2 | 8/2004 | Yoshimoto et al. | |
| 7,334,086 B2 | 2/2008 | Hass et al. | |
| 7,346,755 B2 | 3/2008 | Pomaranski | |
| 7,373,453 B2 * | 5/2008 | Kang | G06F 13/1647 710/110 |
| 7,444,523 B2 | 10/2008 | Morais et al. | |
| 7,734,926 B2 * | 6/2010 | Morais | G06F 12/1408 713/181 |
| 7,920,701 B1 | 4/2011 | Cox et al. | |
| 8,001,374 B2 | 8/2011 | Wise | |
| 8,060,756 B2 | 11/2011 | Rao et al. | |
| 8,135,962 B2 | 3/2012 | Strongin et al. | |
| 8,171,309 B1 | 5/2012 | Poo et al. | |
| 8,812,804 B2 | 8/2014 | Goss et al. | |
| 9,026,688 B2 | 5/2015 | Stroud | |
| 9,063,879 B2 | 6/2015 | Yang et al. | |
| 9,124,650 B2 | 9/2015 | Maharajh et al. | |
| 9,141,557 B2 | 9/2015 | Pandya | |
| 9,201,608 B2 | 12/2015 | Hendry et al. | |
| 9,256,551 B2 | 2/2016 | Paaske et al. | |
| 9,432,196 B2 | 8/2016 | Goss et al. | |
| 9,466,102 B2 | 10/2016 | Nadar et al. | |
| 2006/0005047 A1 | 1/2006 | Lekatsas et al. | |
| 2007/0174910 A1 | 7/2007 | Zachman et al. | |
| 2007/0209072 A1 * | 9/2007 | Chen | G06F 21/10 726/16 |
| 2008/0080715 A1 | 4/2008 | Lee et al. | |
| 2008/0189479 A1 * | 8/2008 | Cope | G06F 12/0607 711/104 |
| 2009/0262929 A1 | 10/2009 | Walmsley | |
| 2010/0057823 A1 * | 3/2010 | Filseth | H04L 9/0631 708/492 |
| 2011/0158403 A1 * | 6/2011 | Mathew | H04L 9/0631 380/44 |
| 2011/0161677 A1 | 6/2011 | Savagaonkar et al. | |
| 2013/0024930 A1 | 1/2013 | Steil et al. | |
| 2013/0305388 A1 * | 11/2013 | Kottilingal | G06F 21/6218 726/28 |
| 2015/0370628 A1 | 12/2015 | Zmudzinski | |
| 2015/0371063 A1 * | 12/2015 | Van Antwerpen | G06F 21/80 713/190 |
| 2016/0036696 A1 | 2/2016 | Hass et al. | |
| 2017/0061138 A1 * | 3/2017 | Lambert | H04L 63/18 |

\* cited by examiner

COMPUTING SYSTEM HAVING AN ON-THE-FLY ENCRYPTOR AND AN OPERATING METHOD THEREOF

CROSS-REFERENCE TO RELATED APPLICATIONS

This U.S. non-provisional patent application claims priority under 35 U.S.C. § 119 to Korean Patent Provisional Application No. 10-2016-0066143 filed on May 30, 2016, and Korean Patent Applications No. 10-2016-0093582 filed on Jul. 22, 2016, and No. 10-2016-0144663 filed on Nov. 1, 2016 the disclosures of which are incorporated by reference herein in their entireties.

BACKGROUND

Embodiments of the inventive concept disclosed herein relate to a computing system having an on-the-fly encryptor and an operating method thereof.

A dynamic random access memory (DRAM) is a type of memory that stores each bit of data in a separate capacitor within an integrated circuit. The DRAM is generally used as a main memory of a system, and thus, influences the entire performance of the system. To protect the DRAM from having its data probed, a variety of methods have been developed. For example, a central processing unit (CPU) and the DRAM may be manufactured with silicon, and attached to each other through a through silicon via (TSV) on one die. However, this method is quite expensive. In yet another method, all or a portion of important data stored in the DRAM may be encrypted. However, if encryption logic is arranged between the CPU and the DRAM, the speed of the system overall decreases.

SUMMARY

Embodiments of the inventive concept provide a computing system that prevents reduction in performance of a system and encrypts a DRAM expensively and an operating method thereof.

According to an aspect of an exemplary embodiment, an operating method of a computing system, the method comprising: receiving, at an on-the-fly encryptor, an address for an access to a pseudo secure memory and data from a central processing unit; converting, at the on-the-fly encryptor, the address into a memory address for an access to a main memory; encrypting, at the on-the-fly encryptor, the data based on an encryption algorithm; and storing, at a memory controller, the encrypted data in a main memory corresponding to the memory address.

According to an aspect of an exemplary embodiment, an operating method of an integrated circuit, the method comprising: issuing, at a central processing unit connected to a first layer bus, read transactions to an on-the-fly encryptor through a multi-layer bus connected to the first layer bus; issuing, at the on-the-fly encryptor, corresponding read transactions to memory controllers connected to the first layer bus through the multi-layer bus or a second multi-layer bus; receiving, at the on-the-fly encryptor, data corresponding to the read transactions from the memory controllers through the multi-layer bus; decrypting, at the on-the-fly encryptor, the received data; and transferring, at the on-the-fly encryptor, the decrypted data to the central processing unit through the multi-layer bus and the first layer bus.

According to an aspect of an exemplary embodiment an operating method of an integrated circuit, the method comprising: transferring, at a central processing unit connected to a first layer bus, secure data to an on-the-fly encryptor through a second layer bus connected to the first layer bus; encrypting, at the on-the-fly encryptor, the secure data; transferring, at the on-the-fly encryptor, the encrypted data to a first memory controller connected to the first layer bus through the second layer bus or another second layer bus; storing the encrypted data in an encryption data area of a first memory connected to the first memory controller; transferring, at the central processing unit, non-secure data to a second memory controller connected to the first layer bus; and storing the non-secure data in a non-encryption data area of a second memory connected to the second memory controller, wherein the first memory controller is the same as or different from the second memory controller.

According to an aspect of an exemplary embodiment, an integrated circuit comprising: a first layer bus; a second layer control bus connected to the first layer bus; a third layer control bus connected to the second layer control bus; a second layer data bus connected to the first layer bus; a third layer data bus connected to the second layer data bus; a central processing unit connected to the first layer bus; at least one memory controller connected to the first layer bus; and an on-the-fly encryptor receiving a write transaction or a read transaction through the second and third layer control buses and performing a function of a pseudo secure memory, wherein the on-the-fly encryptor is configured to: encrypt data transferred from the central processing unit in response to the write transaction during a write operation of the pseudo secure memory and transfer the encrypted data to the at least one memory controller through the second and third layer data buses; or receive encrypted data transferred from the at least one memory controller in response to the read transaction during a read operation of the pseudo secure memory and decrypt the received encrypted data.

According to an aspect of an exemplary embodiment, an operating method of a computing system includes sending, at a central processing unit (CPU), a write request for data to an on-the-fly encryptor, receiving, at the on-the-fly encryptor, the data output from the CPU through a bus, encrypting, at the on-the-fly encryptor, the data in response to the write request, sending the encrypted data to a corresponding memory controller through the bus, and storing the encrypted data in a memory connected to the corresponding memory controller.

According to an aspect of an exemplary embodiment, an operating method of a computing system includes sending, at a CPU, secure data to an on-the-fly encryptor through a bus, encrypting, at the on-the-fly encryptor, the secure data, sending the encrypted data to a first memory controller through the bus, storing the encrypted data in an encrypted data area of a first memory connected to the first memory controller, sending normal data from the CPU to a second memory controller through the bus, and storing the normal data in an unencrypted data area of a second memory connected to the second memory controller.

According to an aspect of an exemplary embodiment, a computing system includes an integrated circuit, and a plurality of memories connected to the integrated circuit. The integrated circuit includes a CPU connected to a bus, an on-the-fly encryptor connected to the bus to function as a pseudo secure memory, and a plurality of memory controllers connected to the bus and corresponding to the plurality of memories, respectively. During a write operation of the pseudo secure memory, the on-the-fly encryptor encrypts data by using an encryption algorithm and sends the encrypted data to a corresponding memory controller through the bus. During a read operation of the pseudo secure memory, the on-the-fly encryptor decrypts data read from one of the plurality of memories by using the encryption algorithm and sends the decrypted data to the CPU through the bus.

According to an aspect of an exemplary embodiment, a computing system includes a CPU, an on-the-fly encryptor configured to function as a pseudo secure memory and to encrypt unencrypted data or decrypt encrypted data, and at least one main memory. The CPU accesses the on-the-fly encryptor by using a first address, and the on-the-fly encryptor receives the first address and accesses the at least one main memory by using a second address that is obtained by converting the first address.

According to an aspect of an exemplary embodiment, a system-on-chip includes a system bus, a CPU connected to the system bus, an internal read only memory connected to the system bus, an on-the-fly encryptor connected to the system bus, and at least one memory controller connected to the system bus. The on-the-fly encryptor receives unencrypted data from the CPU through the system bus, encrypts the unencrypted data by using an encryption algorithm, and sends the encrypted data to the at least one memory controller through the system bus. The on-the-fly encryptor receives the encrypted data from the at least one memory controller through the system bus, decrypts the encrypted data by using the encryption algorithm, and sends the decrypted data to the CPU through the system bus.

BRIEF DESCRIPTION OF THE FIGURES

The above and other features of the inventive concept will become apparent from the following description taken in conjunction with the accompanying figures in which.

DETAILED DESCRIPTION OF THE EMBODIMENTS

Figure 1:
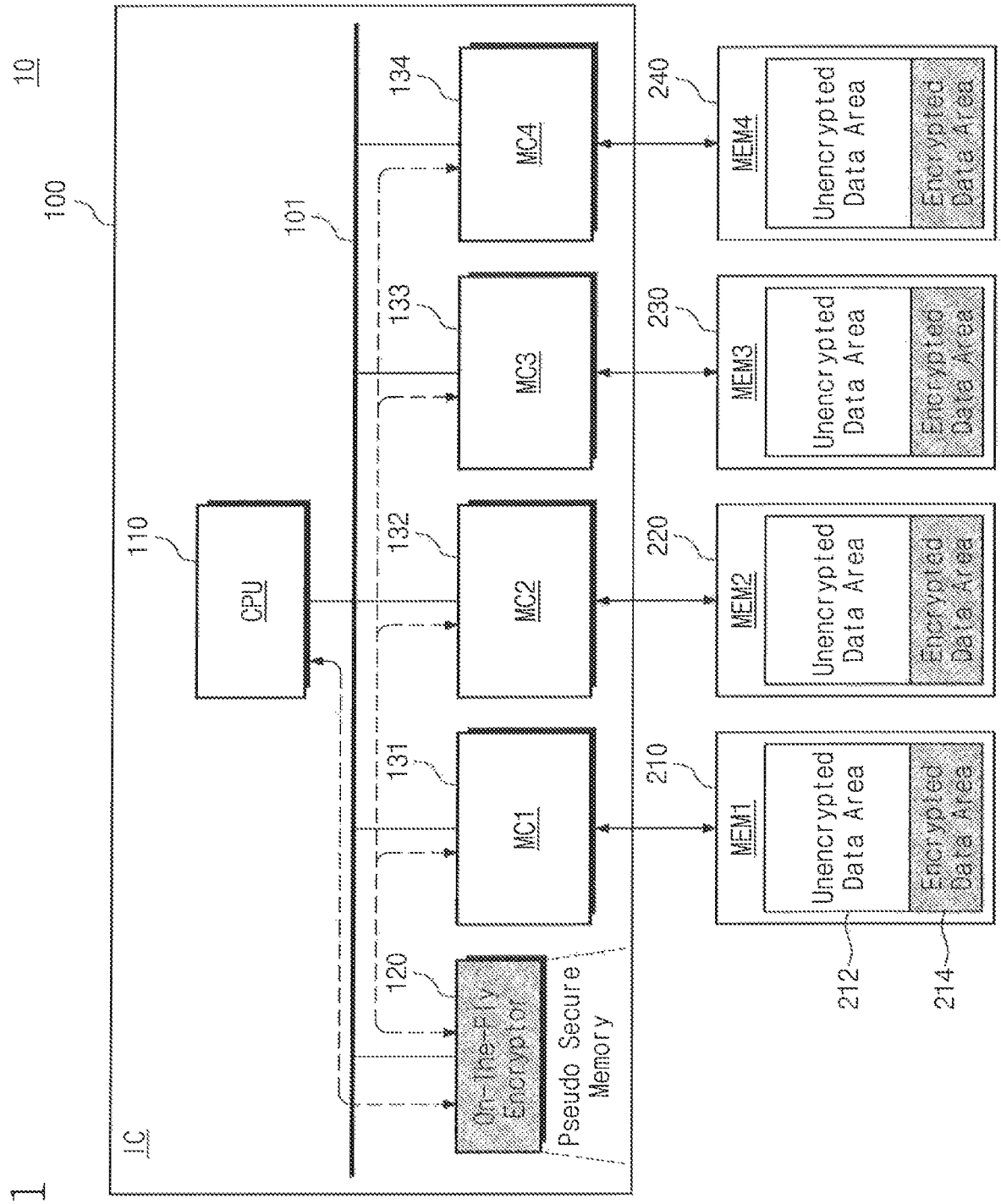
FIG. 1 illustrates a computing system according to an exemplary embodiment of the inventive concept.

FIG. 1 illustrates a computing system according to an exemplary embodiment of the inventive concept. Referring to FIG. 1, a computing system 10 may include an integrated circuit (IC) 100 and a plurality of memories (MEM1, MEM2, MEM3, and MEM4) 210, 220, 230, and 240 connected thereto. For convenience of description, four memories 210 to 240 are illustrated in FIG. 1. However, the number of memories may not be limited thereto.

The integrated circuit 100 may include a CPU 110, an on-the-fly encryptor 120, and a plurality of memory controllers (MC1, MC2, MC3, MC4) 131, 132, 133, and 134.

The on-the-fly encryptor 120 and the memory controllers 131 to 134 are connected in common to a bus 101. In an exemplary embodiment, the integrated circuit 100 may be implemented with a system-on-chip (SoC). It is to be understood that the bus 101 may have a multiple-layered bus architecture.

The CPU 110 may control operations of the integrated circuit 110 by driving an operating system. The CPU 110 may be implemented to perform an arithmetic logic operation or to perform data processing based on an instruction. Although not illustrated FIG. 1, the CPU 110 may include a program counter, an arithmetic logic unit (ALU), registers, etc.

The on-the-fly encryptor 120 may be implemented to encrypt data transmitted from the CPU 110 through the bus 101 or to decrypt encrypted data transmitted from at least one memory controller 131/132/133/134 through the bus 101. In an exemplary embodiment, the on-the-fly encryptor 120 may be implemented by an encryption algorithm.

For example, the encryption algorithm may be an advanced encryption standard (AES), a data encryption standard (DES), a triple DES, SEED, a high security and light weight (HIGHT), ARIA, a lightweight encryption algorithm (LEA), or the like. In an exemplary embodiment, the encryption algorithm may perform an encryption/decryption operation in a block encryption mode. Here, the block encryption mode may be an electronic code book (ECB) mode, a cipher block chaining (CBC) mode, a counter (CTR) mode, a propagating cipher block chaining (PCBC) mode, a cipher feedback (CFB) mode, or the like.

In an exemplary embodiment, the on-the-fly encryptor 120 may be a slave device with regard to the CPU 110.

In an exemplary embodiment, the on-the-fly encryptor 120 may be a master device with regard to the memory controllers 131 to 134.

The on-the-fly encryptor 120 may be recognized by the CPU 110 as a kind of secure memory. An address space that is sufficient to perform a secure memory function may be allocated to on-the-fly encryptor 120. For this reason, the on-the-fly encryptor 120 may be referred to as a "pseudo secure memory".

Also, the process in which the CPU 110 performs a write operation with respect to the on-the-fly encryptor 120 functioning as the pseudo secure memory is as follows. The CPU 110 may send a data write request to the on-the-fly encryptor 120 through the bus 101 by using an address allocated to the on-the-fly encryptor 120. The on-the-fly encryptor 120 may encrypt data in response to the write request and may send the encrypted data to a corresponding memory controller through the bus 101. The encrypted data may be stored in an encrypted data area 214 of a corresponding memory. It should be appreciated that the term "on-the-fly" is used in that encrypted data is directly stored in the encrypted data area 214 of a memory without being stored in the on-the-fly encryptor 120.

Also, the process in which the CPU 110 performs a read operation with respect to the on-the-fly encryptor 120 functioning as the pseudo secure memory is as follows. The CPU 110 may send a data read request to the on-the-fly encryptor 120 through the bus 101 by using an address allocated to the on-the-fly encryptor 120. The on-the-fly encryptor 120 may send a memory read request to a corresponding memory controller in response to the read request. The memory controller may read encrypted data stored in the encrypted data area 214 in response to the memory read request and may send the read encrypted data to the on-the-fly encryptor 120 through the bus 101. The on-the-fly encryptor 120 may decrypt the encrypted data and may send the decrypted data to the CPU 110 through the bus 101.

Under control of the corresponding memory controllers 131 to 134, the CPU 110 may directly request a read/write operation of each of the memories 210 to 240 from an unencrypted data area 212 without passing through the on-the-fly encryptor 120.

The memories 210 to 240 may be respectively connected to the memory controllers 131 to 134. In an exemplary embodiment, the memories 210 to 240 and the memory controllers 131 to 134 may be connected by a double data rate (DDR) interface. However, it should be appreciated that an interface for connecting the memories 210 to 240 and the memory controllers 131 to 134 is not limited to the DDR interface.

Each of the memories 210 to 214 may be implemented to store data (encrypted data and unencrypted data) that is needed for an operation of the CPU 110. In an exemplary embodiment, each of the memories 210 to 240 may be implemented with a DRAM, a synchronous DRAM (SDRAM), a DDR SDRAM, a low power DDR (LPDDR) SDRAM, a Rambus DRAM (RDRAM), a dual in-line memory module (DIMM), a nonvolatile DIMM (NVDIMM), a phase change random access memory (PRAM), etc.

In an exemplary embodiment, each of the memories 210 to 240 may include an unencrypted data area 212 that stores unencrypted data and the encrypted data area 214 that stores encrypted data. In an exemplary embodiment, the unencrypted data area 212 and the encrypted data area 214 may be fixed. In another embodiment, the unencrypted data area 212 and the encrypted data area 214 may be variable.

In an exemplary embodiment, data may be stored in the memories 210 to 240 in an interleaving way.

The computing system 10 according to an exemplary embodiment of the inventive concept may minimize reduction of performance by separating a transmission path of encrypted data between the CPU 110 and a main memory 200 from a transmission path of unencrypted data therebetween.

Also, the computing system 10 according to an exemplary embodiment of the inventive concept may not cause an additional latency associated with transmission of unencrypted data by sending encrypted data through a path that is different from that of the unencrypted data.

In addition, compared to a conventional computing system, the computing system 10 according to an exemplary embodiment of the inventive concept may relatively reduce a chip size by using only one on-the-fly encryptor 120 for data encryption while supporting an interleaving function.

The computing system 10 according to an exemplary embodiment of the inventive concept may also improve a data-related security function by encrypting a portion of data while not influencing the overall performance of the computing system 10.

Figure 2:
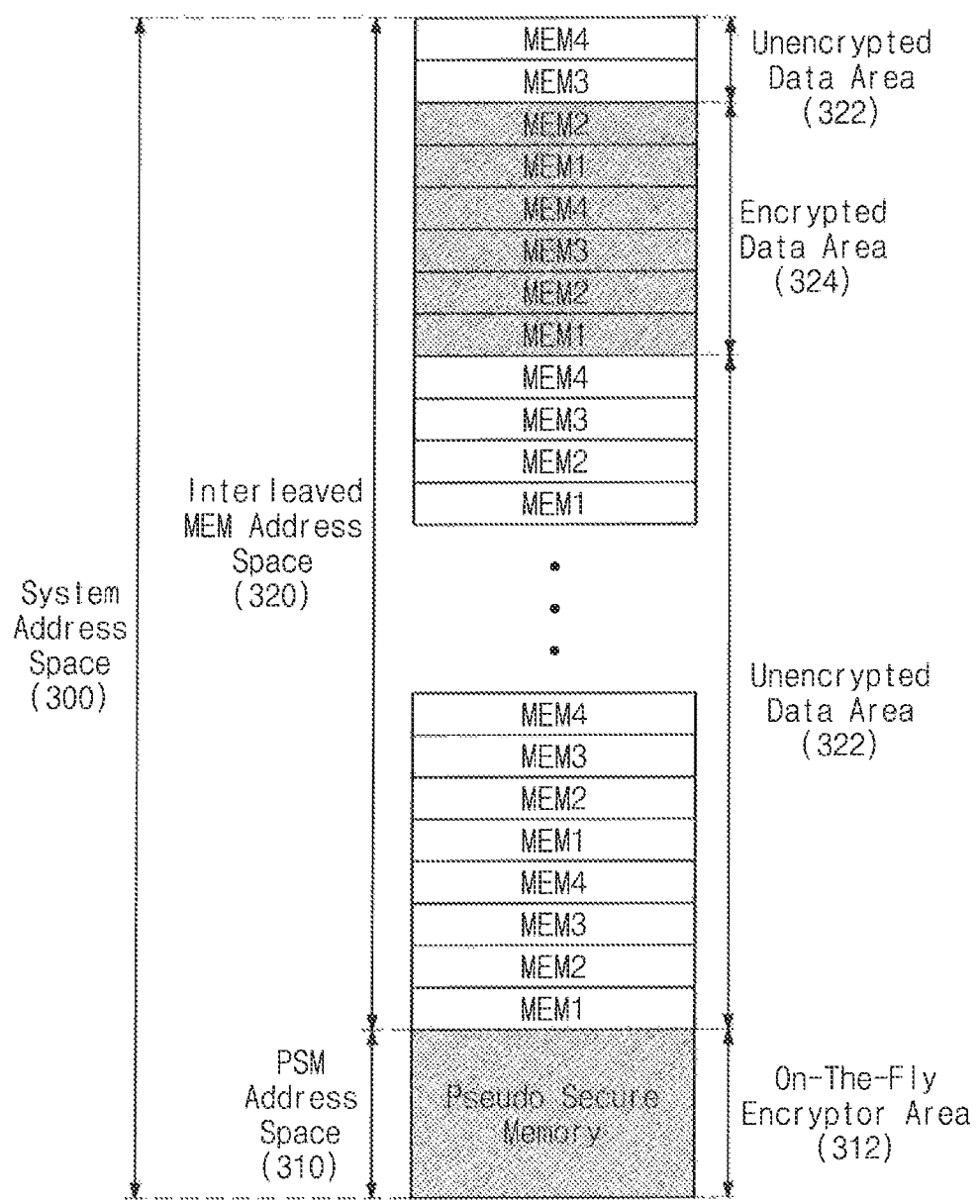
FIG. 2 illustrates an address space of a computing system according to an exemplary embodiment of the inventive concept.

FIG. 2 illustrates an example of an address space of the computing system 10 according to an exemplary embodiment of the inventive concept. Referring to FIG. 2, a system address space 300 may include a pseudo secure memory (PSM) address space 310 and an interleaved memory address space 320. In an exemplary embodiment, the system address space 300 may be a logical address space viewed from the CPU 110.

The pseudo secure memory address space 310 may include an on-the-fly encryptor area 312. The pseudo secure memory address space 310 that is an address space allocated to the on-the-fly encryptor 120 may be recognized by the CPU 110 as a memory space.

The interleaved memory address space 320 may include an unencrypted data area 322 and an encrypted data area 324. In an exemplary embodiment, addresses corresponding to the interleaved memory address space 320 may be allocated to interleave the memories MEM1 to MEM4.

In an exemplary embodiment, the size of the encrypted data area 324 may be determined to correspond to the size of the on-the-fly encryptor area 312. For example, the size of the encrypted data area 324 may be the same as the size of the on-the-fly encryptor area 312.

In an exemplary embodiment, the encrypted data area 324 may be fixed or variable.

Figure 3:
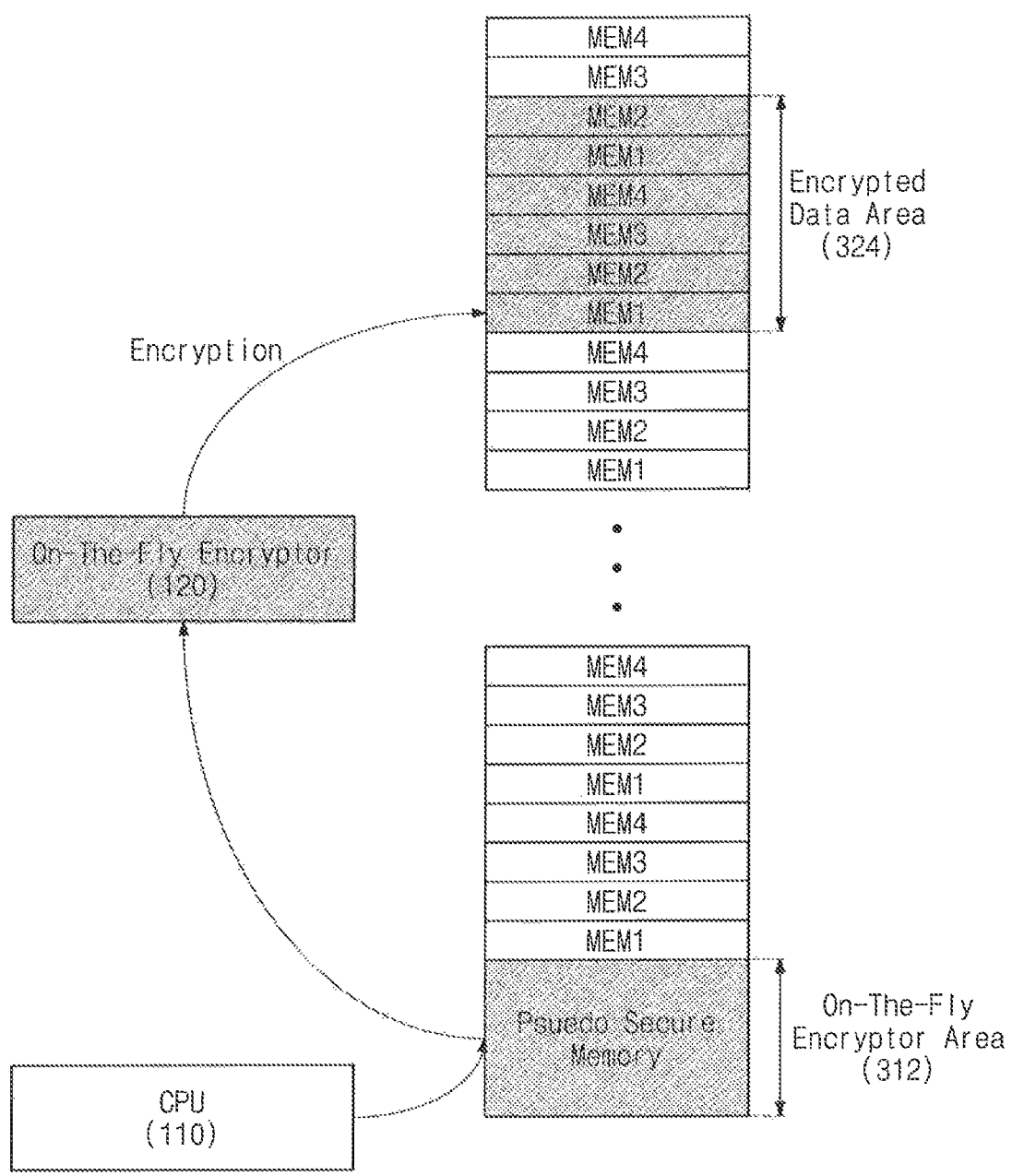
FIG. 3 illustrates a process in which a computing system according to an exemplary embodiment of the inventive concept writes secure data.

FIG. 3 illustrates the process in which the computing system 10 according to an exemplary embodiment of the inventive concept writes data (hereinafter referred to as "secure data") needing security. Referring to FIGS. 1 to 3, secure data may be written through the following process.

The CPU 110 may provide the on-the-fly encryptor 120 with a write request for writing unencrypted data in the pseudo secure memory. Here, an address that is provided together with the write request may be an address that belongs to the on-the-fly encryptor area 312. The on-the-fly encryptor 120 may receive the write request, the address, and the unencrypted data from the CPU 110, may encrypt the unencrypted data by using an encryption algorithm, and may convert the address into an address of the encrypted data area 324. A memory MEM1 (refer to FIG. 1) may store the encrypted data in a corresponding space in response to the write request of the on-the-fly encryptor 120.

Figure 4:
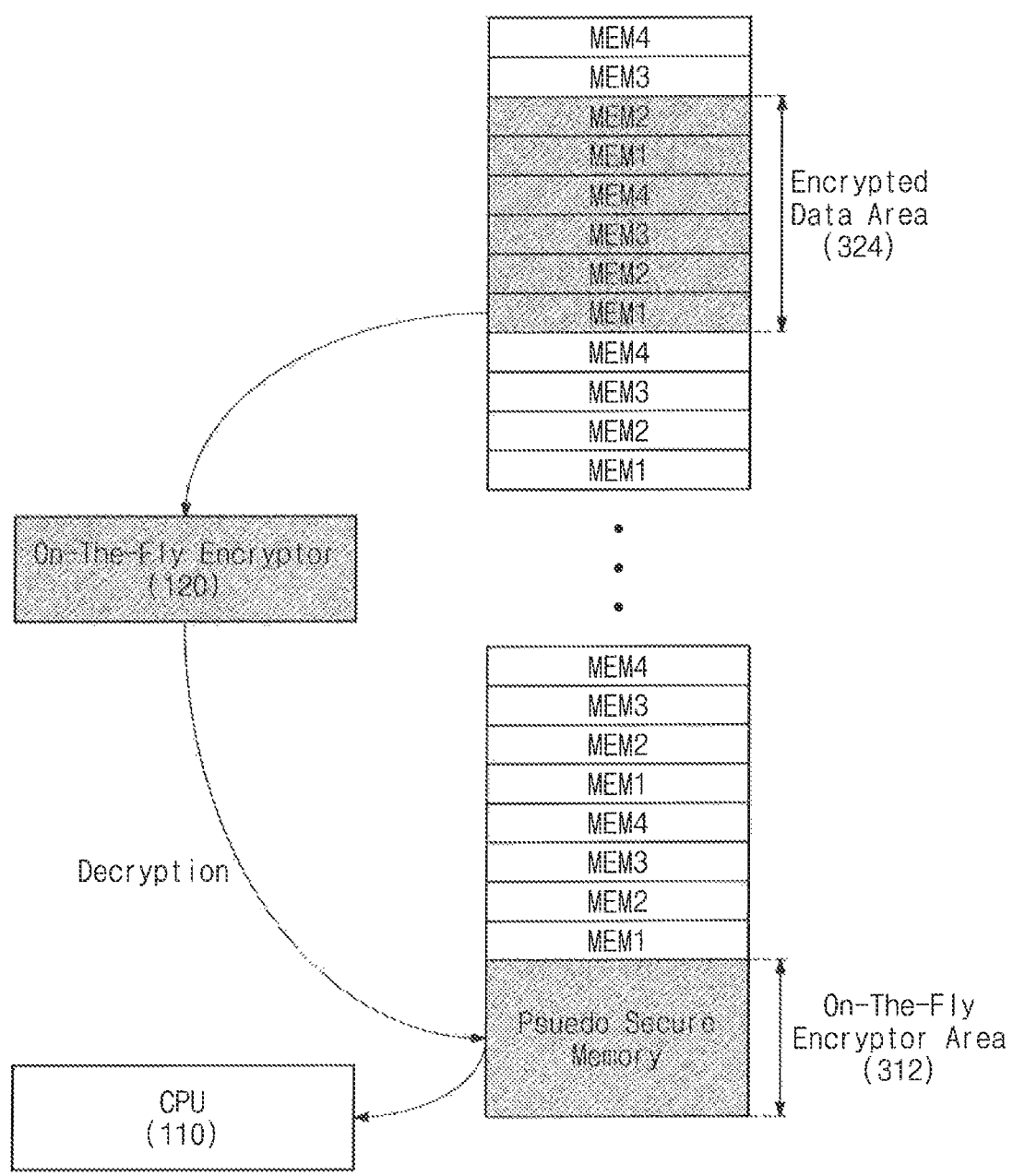
FIG. 4 illustrates a process in which a computing system according to an exemplary embodiment of the inventive concept reads secure data.

FIG. 4 illustrates the process in which the computing system 10 according to an exemplary embodiment of the inventive concept reads secure data. Referring to FIGS. 1 to 4, secure data may be read through the following process.

The CPU 110 may provide the on-the-fly encryptor 120 with a read request for reading unencrypted data from the pseudo secure memory. Here, an address that is provided together with the read request may be an address that belongs to the on-the-fly encryptor area 312. The on-the-fly encryptor 120 may receive the read request and the address from the CPU 110 and may convert the address into an address of the encrypted data area 324. For convenience of description, it is assumed that the converted address directs a first memory MEM1 of the encrypted data area 324. The first memory MEM1 may read encrypted data in response to the read request and may send the read encrypted data to the on-the-fly encryptor 120. The on-the-fly encryptor 120 may receive the encrypted data and may decrypt the encrypted data by using the encryption algorithm. The decrypted data, that is, the unencrypted data may be provided to the CPU 110.

Figure 5:
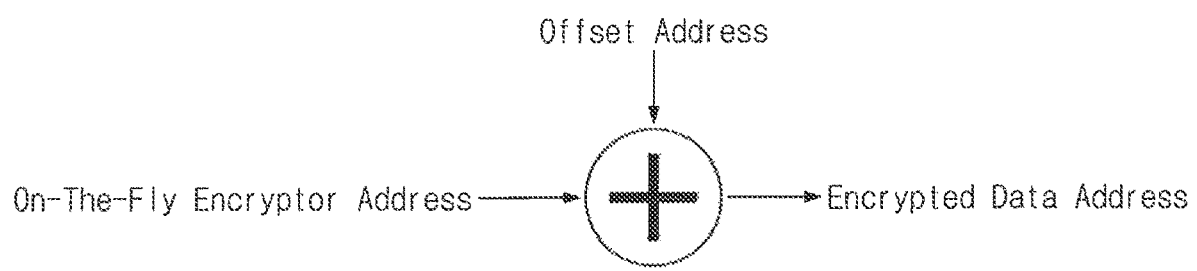
FIG. 5 illustrates a process in which an on-the-fly encryptor according to an exemplary embodiment of the inventive concept converts an address.

FIG. 5 illustrates an example of the process in which the on-the-fly encryptor 120 according to an exemplary embodiment of the inventive concept converts an address. Referring to FIG. 5, the on-the-fly encryptor 120 may generate an encrypted data address by adding an offset address to an on-the-fly encryptor address. Here, the on-the-fly encryptor address may be an address that is needed for the CPU 110 to access the on-the-fly encryptor 120. Also, the encrypted data address may be an address that belongs to the encrypted data area 324 composed of memories MEM1 to MEM4 illustrated in FIGS. 2 to 5.

In an exemplary embodiment, the offset address may be fixed by a chip maker. In another embodiment, the offset address may be variable by software.

An address conversion operation of the on-the-fly encryptor 120 according to an exemplary embodiment of the inventive concept may not be limited to the above description. The on-the-fly encryptor 120 may convert an address by using a base address concept.

Figure 6:
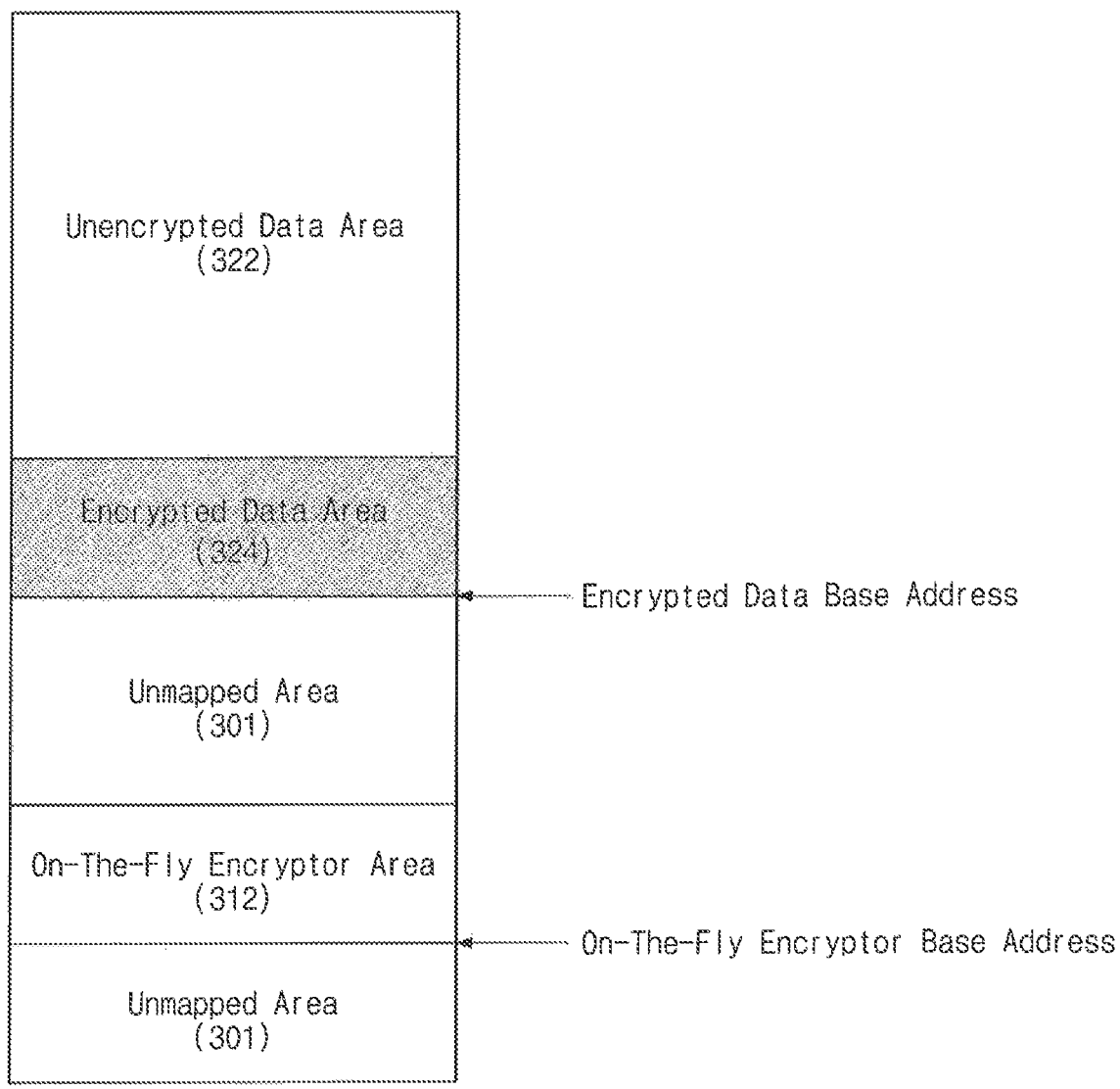
FIG. 6 illustrates a base address used for address conversion of the on-the-fly encryptor according to an exemplary embodiment of the inventive concept.

FIG. 6 illustrates a base address needed for address conversion of the on-the-fly encryptor 120 according to an exemplary embodiment of the inventive concept. Referring to FIG. 6, the on-the-fly encryptor area 312 exists between unmapped areas 301, and a start address of the on-the-fly encryptor area 312 is an on-the-fly encryptor base address. Also, the encrypted data area 324 exists between the unencrypted data area 322 and the unmapped area 301, and a start address of the encrypted data area 324 is an encrypted data base address.

Figure 7:
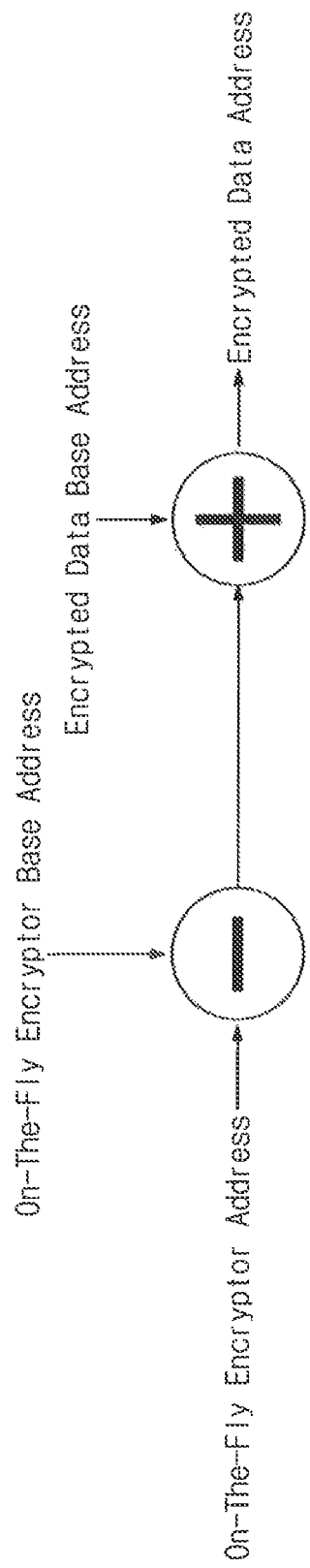
FIG. 7 illustrates a process in which an on-the-fly encryptor according to an exemplary embodiment of the inventive concept converts an address.

FIG. 7 illustrates another example of the process in which the on-the-fly encryptor 120 according to an exemplary embodiment of the inventive concept converts an address. Referring to FIG. 7, the on-the-fly encryptor 120 may generate an encrypted data address by adding an encrypted data based address to an address that is obtained by subtracting an on-the-fly encryptor base address from an on-the-fly encryptor address.

Meanwhile, the computing system 10 according to an exemplary embodiment of the inventive concept may further include access control logic that controls an access to an encrypted data area.

Figure 8:
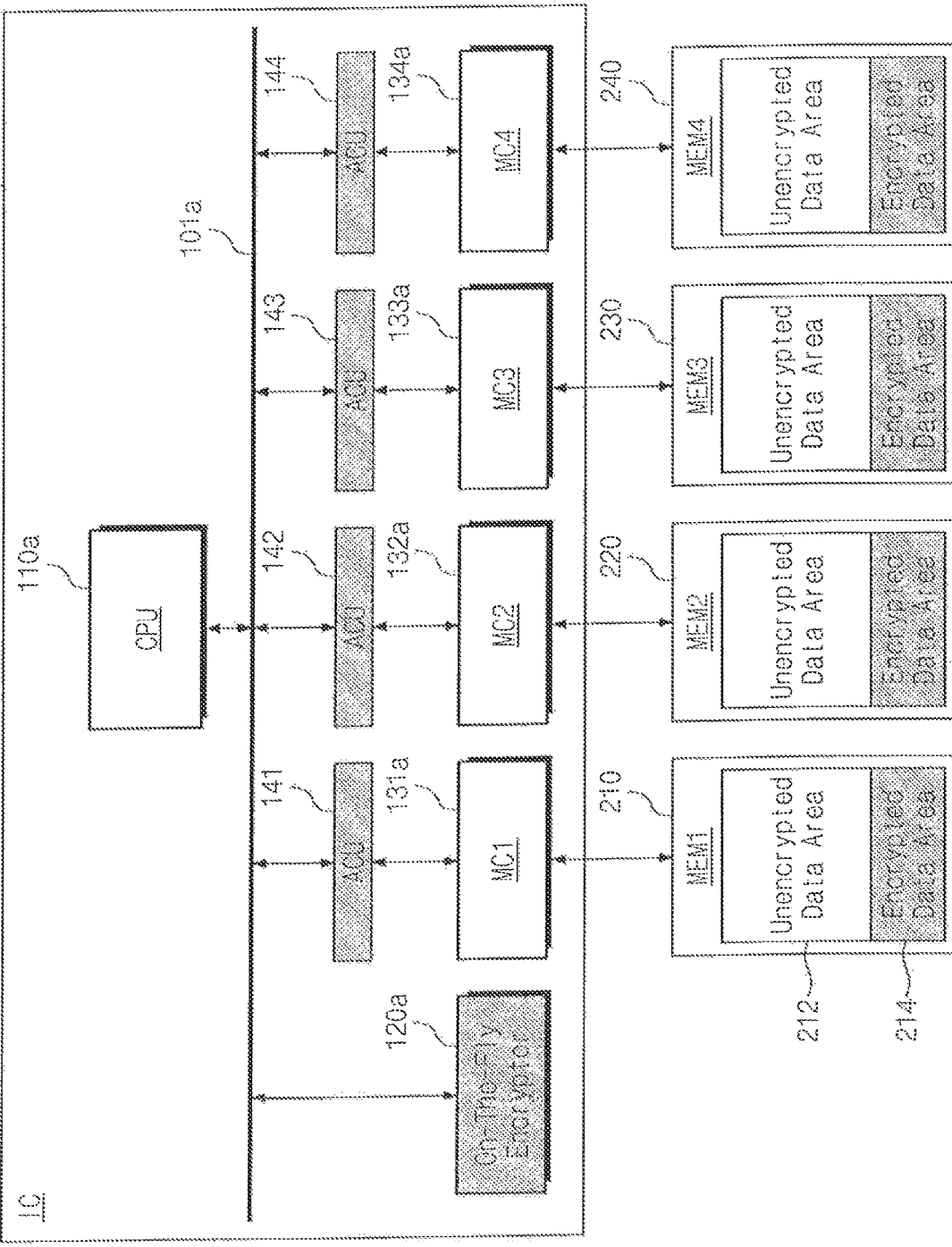
FIG. 8 illustrates a computing system according to an exemplary embodiment of the inventive concept.

FIG. 8 illustrates a computing system 20 according to another embodiment of the inventive concept. Referring to FIG. 8, compared to the computing system 10 of FIG. 1, a computing system 20 may be implemented with an integrated circuit 100a that further includes access control logics 141 to 144.

The access control logics 141 to 144 may control accesses of the CPU 110a to the encrypted data areas 214 of the memories 210 to 240, respectively. For example, each of the access control logics 141 to 144 may be implemented to block an access of the CPU 110a to an encrypted data area. Each of the access control logics 141 to 144 may be implemented to permit only an access of the on-the-fly encryptor 120a to an encrypted data area.

In an exemplary embodiment, each of the access control logics 141 to 144 may be implemented with the trust zone address access controller (TZASC) of the ARM.

The number of access control logics 141 to 144 illustrated in FIG. 8 may be the same as the number of memory controllers 131a to 134a respectively connected to the memories 210 to 240. However, the number of access control logics may not be limited thereto. The computing system 20 according to an exemplary embodiment of the inventive concept may be implemented to include a plurality of memory controllers that are connected to one access control logic.

Meanwhile, the access control logics 141 to 144 are arranged in the front of the memory controllers 131 to 134. However, embodiments are not limited thereto. Each of the access control logics 141 to 144 may be situated in the interior of a corresponding memory controller.

In FIGS. 1 to 8, embodiments are exemplified as a computing system includes the plurality of memory controllers MC1 to MC4. However, embodiments are not limited thereto. For example, a computing system according to an exemplary embodiment of the inventive concept may be implemented to include the memories MEM1 to MEM4 connected to one memory controller.

Meanwhile, a computing system according to an exemplary embodiment of the inventive concept may further include intellectual properties (IPs) for performing various functions.

Figure 9:
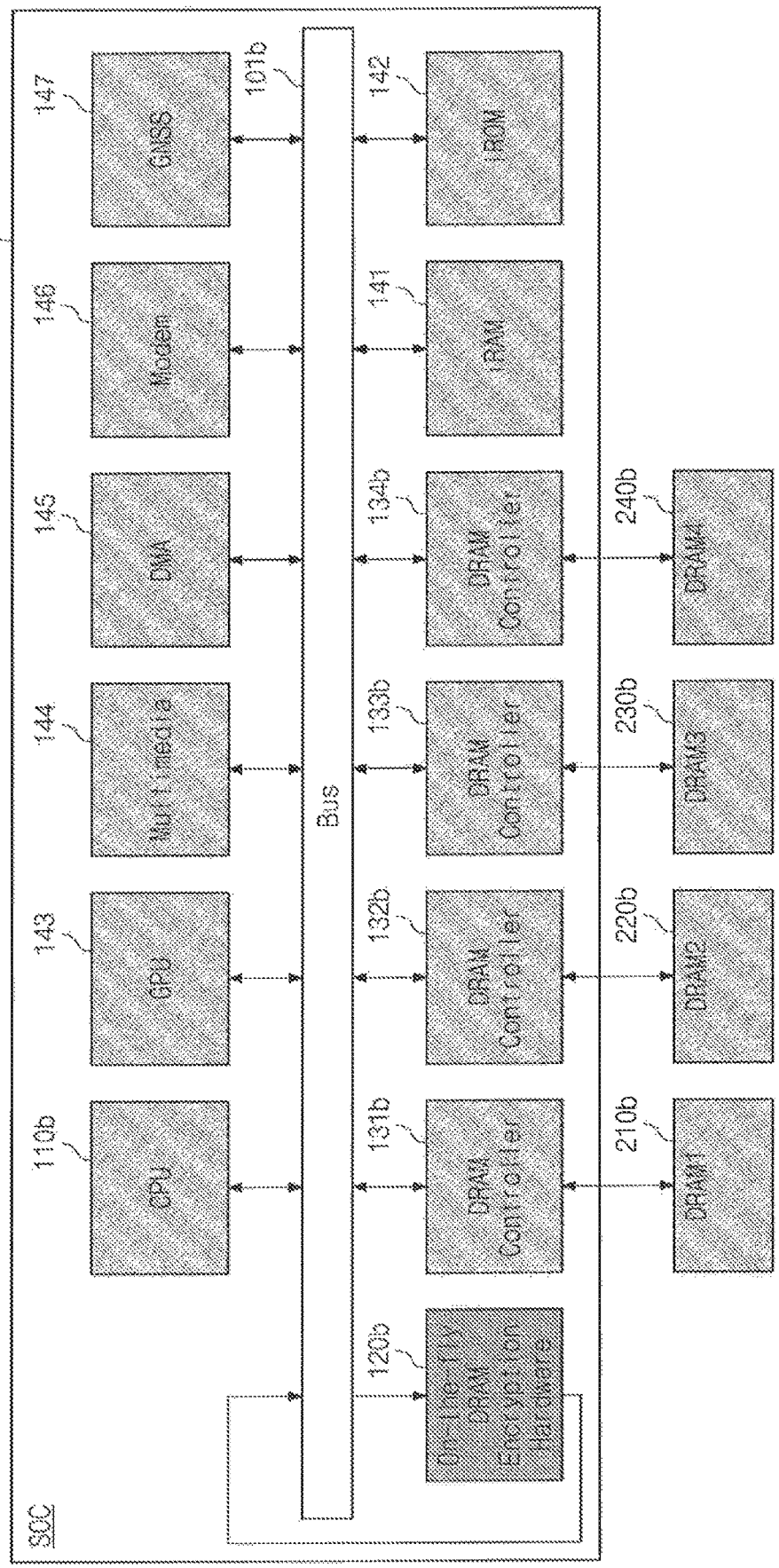
FIG. 9 illustrates a computing system according to an exemplary embodiment of the inventive concept.

FIG. 9 is a block diagram illustrating a computing system 30 according to an exemplary embodiment of the inventive concept. Referring to FIG. 9, a computing system 30 may include an SOC 100b that includes CPU 110a, on-the-fly DRAM encryption hardware 120b, DRAM memory controllers 131b to 134b, an internal SRAM (iRAM) 141, an internal ROM (iROM) 142, a graphic processing unit (GPU) 143, a multimedia chip 144, a direct memory access (DMA) chip 145, a modem 146, and a global navigation satellite system (GNSS) chip 147, and a plurality of DRAMs 210b, 220b, 230b, and 240b.

The CPU 110b, the on-the-fly DRAM encryption hardware 120b, the DRAM memory controllers 131b to 134b, and the DRAMs 210b to 240b that are connected to a bus 101b may be substantially the same as the CPU 110, the on-the-fly encryptor 120, the memory controllers 131 to 134, and the DRAMs 210 to 240, and thus, a description thereof will not be repeated here.

The SOC 110b may include IPs for performing various functions, that is, the internal RAM (iRAM) 141, the internal ROM (iROM) 142, the GPU 143, the multimedia chip 144, the DMA chip 145, the modem 146, the GNSS chip 147, etc.

The internal RAM 141 may be implemented to temporarily store data needed for an operation of the CPU 110b. For example, the internal RAM 141 may be a synchronous random access memory (SRAM). The internal ROM 142 may be implemented to store an operating system/program-related code (instruction) of the CPU 110b. For example, the internal ROM 142 may be implemented with a nonvolatile memory. The GPU 143 may be a graphic-dedicated chip. The multimedia chip 144 may be a multimedia data-dedicated chip. The DMA chip 145 may be implemented to directly access the DRAMs 210b to 240b without passing through the CPU 110b. The modem 146 may be implemented to perform wired and/or wireless communication with the outside. The GNSS chip 147 may be implemented to determine a position of the computing system 30 based on satellite positioning data. Meanwhile, it should be appreciated that the SOC 110b according to an exemplary embodiment of the inventive concept does not include at least one of the IPs illustrated in FIG. 9 and further includes at least one IP that is not illustrated in FIG. 9. Meanwhile, it should be appreciated that the at least two of the IPs of the SOC 110b illustrated in FIG. 9 are implemented with one chip.

Figure 10:
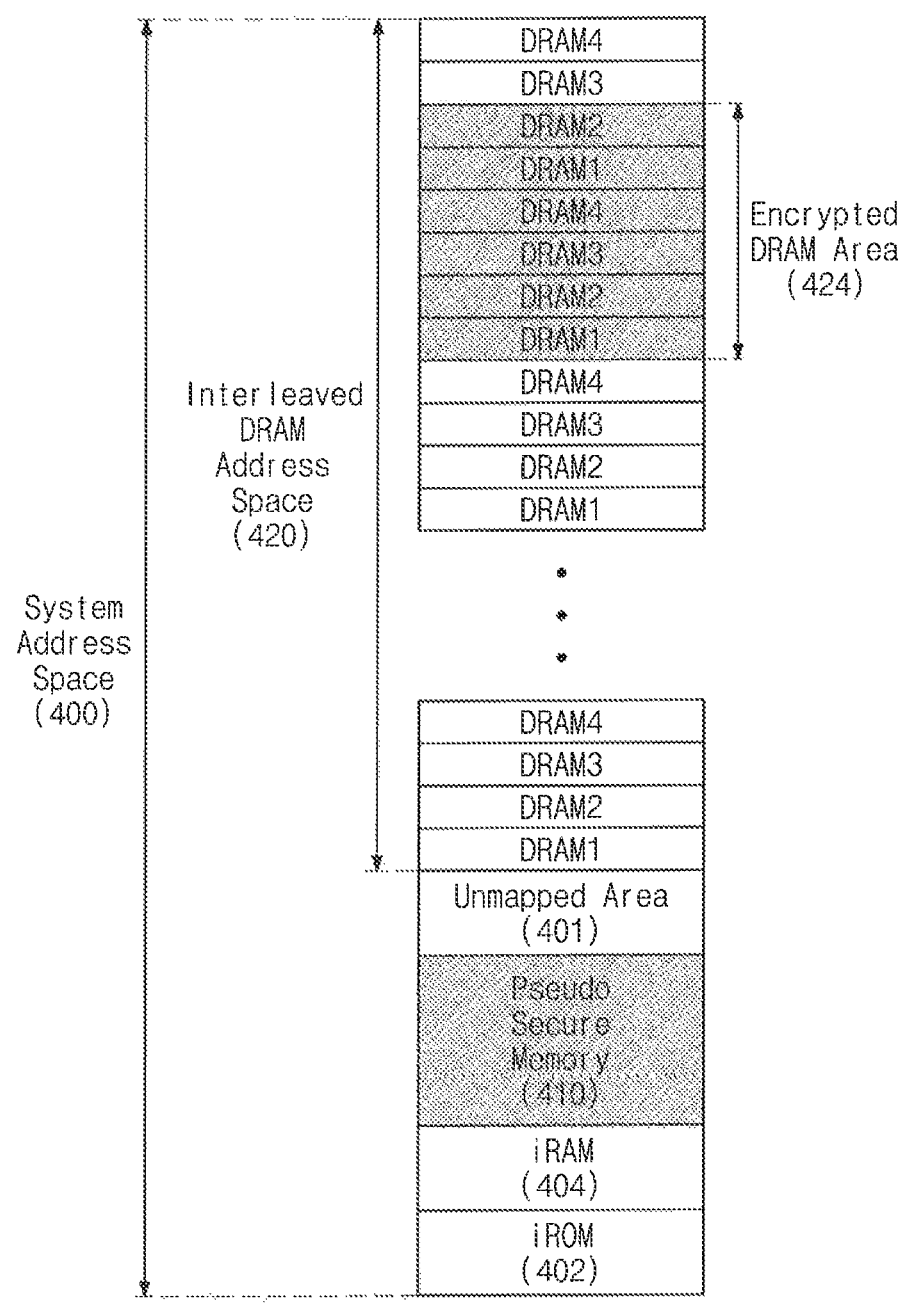
FIG. 10 illustrates a system address space of the computing system of FIG. 9 according to an exemplary embodiment of the inventive concept.

FIG. 10 illustrates a system address space of the computing system 30 of FIG. 9. Referring to FIG. 10, a system address space 400 may include an unmapped area 401, an internal ROM address space 402, an internal RAM address space 404, a pseudo secure memory address space 410, and an interleaved DRAM address space 420.

The interleaved DRAM address space 420 may include an encrypted data area 424. Here, the size of the encrypted data area 424 may correspond to the size of the pseudo secure memory address space 410.

As illustrated in FIG. 10, the system address space 400 may include addresses that are respectively allocated to a plurality of IPs. Here, a minimum size of the assigned address may be a cache unit. In an exemplary embodiment, the cache unit may be 64 bytes. However, an exemplary embodiment of the inventive concept is not limited thereto.

Figure 11:
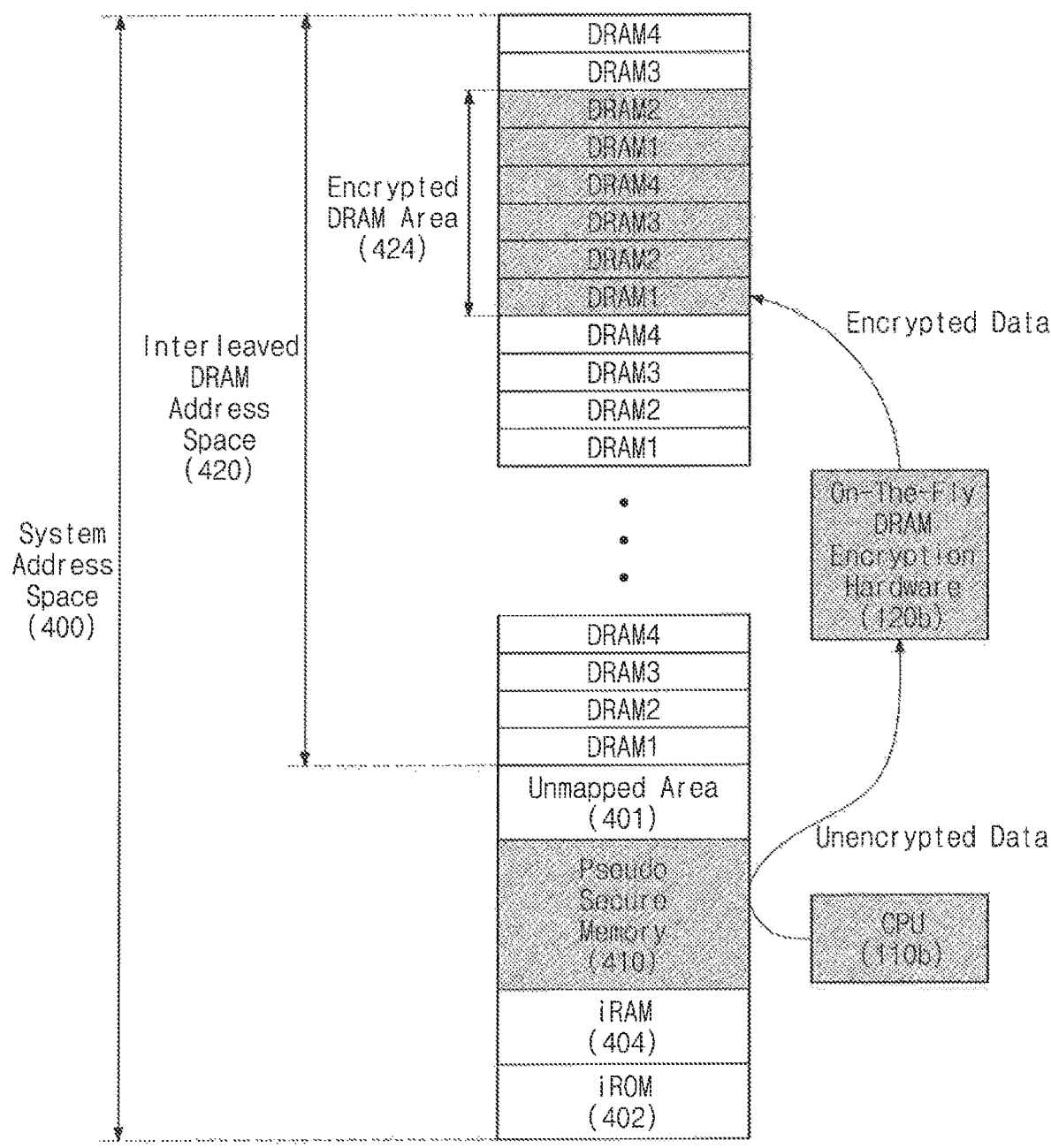
FIG. 11 illustrates a process in which the computing system of FIG. 9 writes encrypted data according to an exemplary embodiment of the inventive concept.

FIG. 11 illustrates the process in which the computing system 30 of FIG. 9 writes encrypted data. Referring to FIGS. 9 to 11, the process of writing encrypted data will be described below.

The CPU 110b may issue a data write request for writing data in a pseudo secure memory. In this case, the issued write request and write data may be provided to the on-the-fly DRAM encryption hardware 120b through the bus 101b. Here, the write data is unencrypted data. The on-the-fly DRAM encryption hardware 120b may receive the unencrypted data (or plain data), may encrypt the unencrypted data by using the encryption algorithm, and may generate a write request and a write address of a corresponding DRAM such that the encrypted data is stored in the encrypted data area 424. Here, the write address may be an address indicating the encrypted data area 424. The corresponding DRAM may store the encrypted data in response to the write request and the write address.

Figure 12:
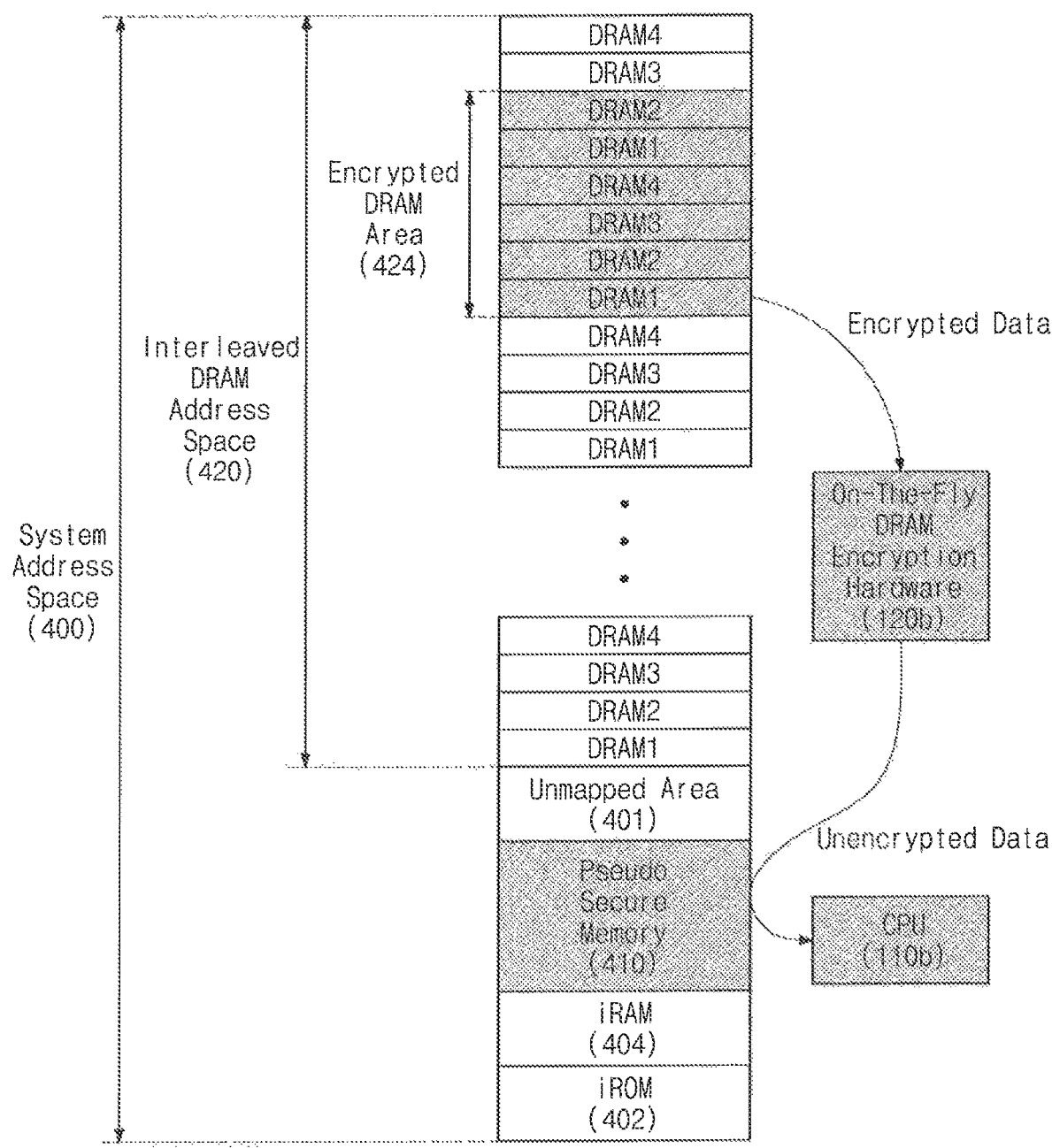
FIG. 12 illustrates a process in which the computing system of FIG. 9 reads encrypted data from an encrypted data area according to an exemplary embodiment of the inventive concept.

FIG. 12 illustrates the process in which the computing system 30 of FIG. 9 reads encrypted data from the encrypted data area 424. Referring to FIGS. 9 to 12, the process of reading encrypted data will be described below.

The CPU 110b may issue a data read request for reading data from the pseudo secure memory. The on-the-fly DRAM encryption hardware 120b may receive the read request and may generate a read request and a read address of a corresponding DRAM such that the encrypted data is read from the encrypted data area 424. Here, the read address may be an address indicating the encrypted data area 424 that stores the encrypted data. The corresponding DRAM may read the encrypted data in response to the read request and the read address and may send the read data to the on-the-fly DRAM encryption hardware 120b through the bus 101b. The on-the-fly DRAM encryption hardware 120b may receive the encrypted data, may decrypt the encrypted data by using the encryption algorithm, and may send the decrypted data, that is, unencrypted data to the CPU 110b through the bus 101b.

Figure 13:
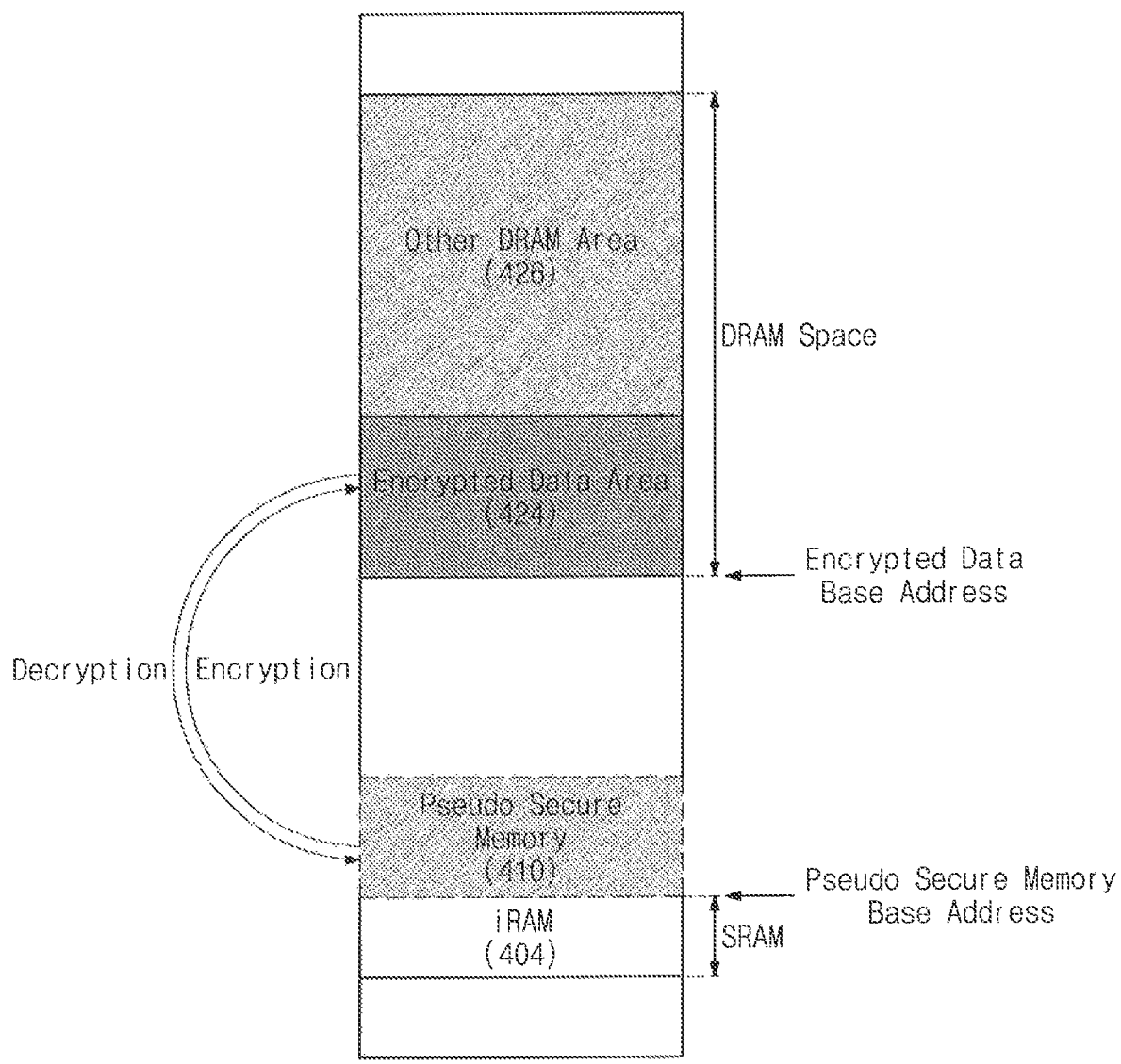
FIG. 13 illustrates a base address being applied to the computing system of FIG. 9 according to an exemplary embodiment of the inventive concept.

FIG. 13 illustrates an exemplary embodiment in which a base address concept is applied to the computing system 30 of FIG. 9. Referring to FIG. 13, the system address space 400 may include the internal RAM address space 404, the pseudo secure memory address space 410, the encrypted data area 424, and any other DRAM area 426.

Encrypted data and unencrypted data may be exchanged between the pseudo secure memory address space 410 and the encrypted data area 424. That is, unencrypted data stored in the pseudo secure memory address space 410 may be encrypted by the on-the-fly DRAM encryption hardware 120b, and the encrypted data may be stored in the encrypted data area 424. Also, encrypted data stored in the encrypted data area 424 may be decrypted by the on-the-fly DRAM encryption hardware 120b, and the decrypted data, that is, unencrypted data may be stored in the pseudo secure memory address space 410.

Meanwhile, an address mapping relation between the pseudo secure memory address space 410 and the encrypted data area 424 may be determined by an address conversion operation of the on-the-fly DRAM encryption hardware 120b. As illustrated in FIG. 13, a start address of the pseudo secure memory address space 410 is a pseudo secure memory base address, and a start address of the encrypted data area 424 may be an encrypted data base address. The address conversion operation may be performed by using the pseudo secure memory base address and the encrypted data base address.

Figure 14:
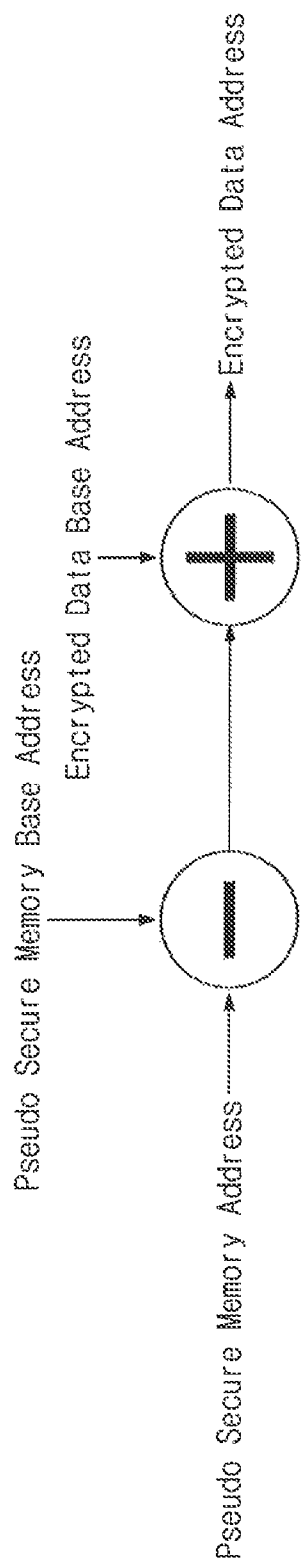
FIG. 14 illustrates address conversion of an on-the-fly dynamic random access memory (DRAM) encryption hardware in the computing system of FIG. 9 according to an exemplary embodiment of the inventive concept.

FIG. 14 illustrates address conversion of the on-the-fly DRAM encryption hardware 120b in the computing system 30 of FIG. 9. Referring to FIGS. 9 to 14, the on-the-fly DRAM encryption hardware 120 may generate an encrypted data address by adding an encrypted data based address to an address that is obtained by subtracting a pseudo secure memory base address from a pseudo secure memory address. However, the address conversion of the on-the-fly DRAM encryption hardware 120b is not limited thereto.

A computing system according to an exemplary embodiment of the inventive concept may be described below from the perspective of a data path.

Figure 15:
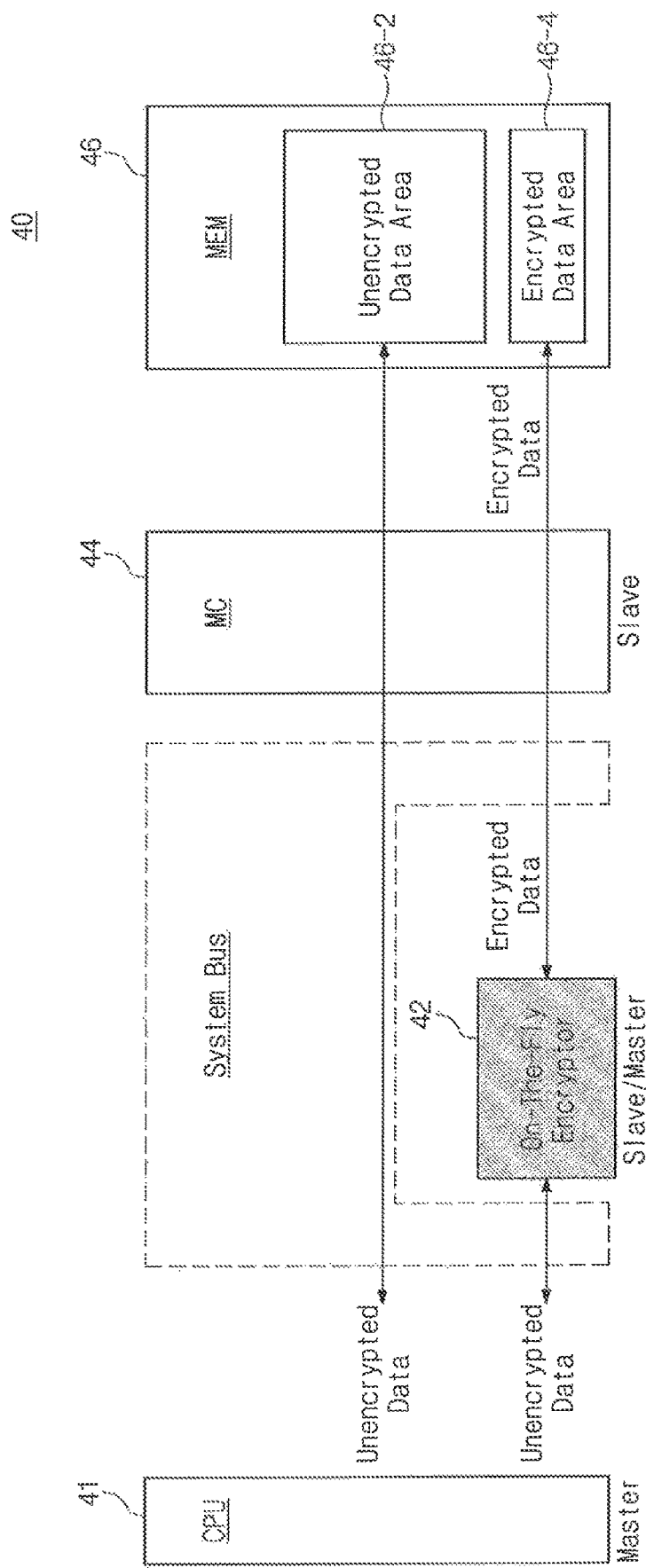
FIG. 15 illustrates a data path of a computing system according to an exemplary embodiment of the inventive concept.

FIG. 15 illustrates a data path of a computing system 40 according to an exemplary embodiment of the inventive concept. Referring to FIG. 15, the computing system 40 may be implemented such that a first path in which unencrypted data from a CPU 41 is transmitted without modification and a second path in which unencrypted data is transmitted after being encrypted are separated from each other.

In the first path, the CPU 41 is a first master, and a memory controller (MC) 44 is a first slave. Under control of the CPU 41, the memory controller 44 may store unencrypted data in an unencrypted data area 46-2 of a memory 46 or may read unencrypted data from the unencrypted data area 46-2. In an exemplary embodiment, unencrypted data may be exchanged through a system bus between the CPU 41 and the memory controller 44.

In the second path, the CPU 41 may be a first master, an on-the-fly encryptor 42 may be a second slave or a second master, and the memory controller 44 may be a third slave. Under control of the CPU 41, the on-the-fly encryptor 42 may encrypt unencrypted data or may decrypt encrypted data. Also, under control of the on-the-fly encryptor 42, the memory controller 44 may store encrypted data in an encrypted data area 46-4 of the memory 46 or may read encrypted data from the encrypted data area 46-4. In an exemplary embodiment, unencrypted data may be exchanged through the system bus between the CPU 41 and the on-the-fly encryptor 42, or encrypted data may be exchanged through the system bus between the on-the-fly encryptor 42 and the memory controller 44.

Meanwhile, a computing system according to an exemplary embodiment of the inventive concept may add a scramble function to a data path.

Figure 16:
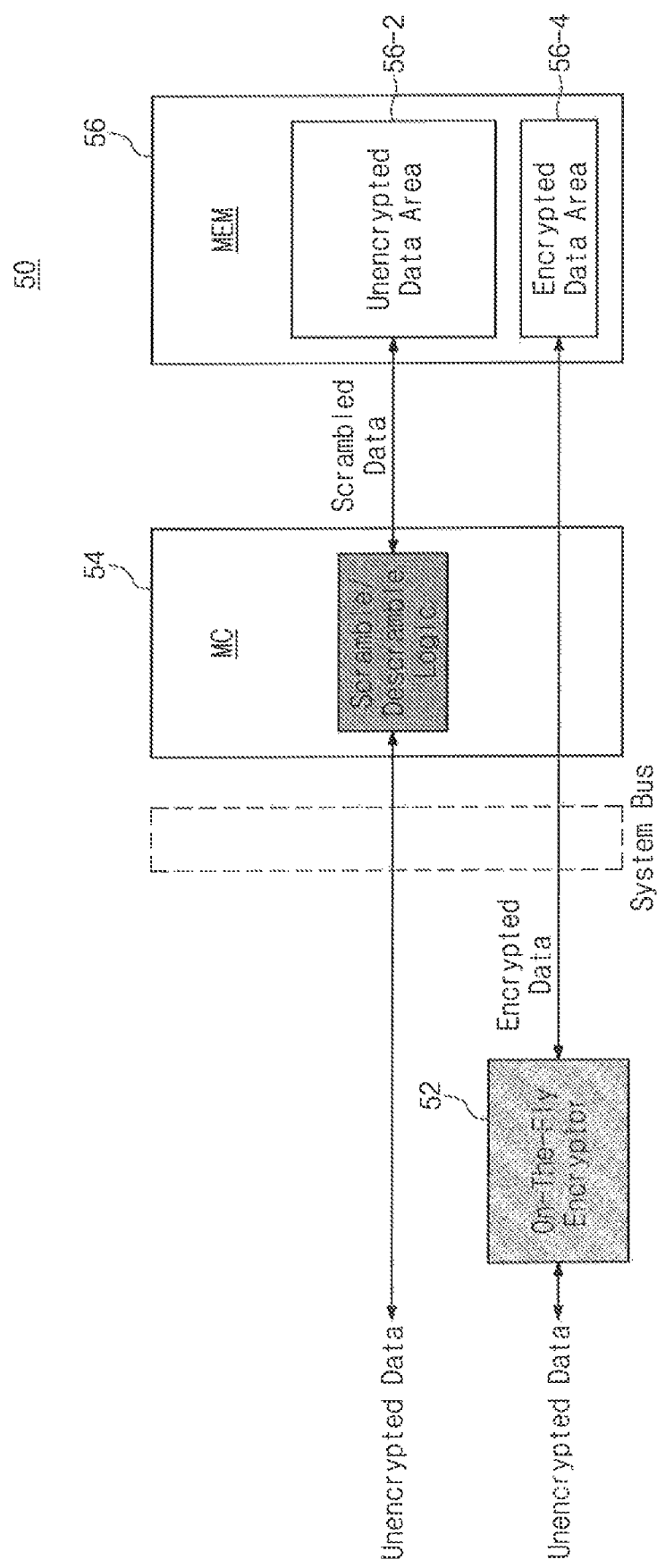
FIG. 16 illustrates a data path of a computing system, to which a scramble function is added, according to an exemplary embodiment of the inventive concept.

FIG. 16 illustrates a data path of a computing system 50, to which a scramble function is added, according to an exemplary embodiment of the inventive concept. Referring to FIG. 16, the computing system 50 may be implemented such that a path in which unencrypted data is scrambled and transmitted and a path in which encrypted data is transmitted are separated from each other.

In an exemplary embodiment, unencrypted data may be scrambled by scramble/descramble logic 54-1 of a memory controller (MC) 54. The scrambled data may be stored in an unencrypted data area 56-2 of a memory (MEM) 56. Also, scrambled data stored in the unencrypted data area 56-2 may be descrambled by the scramble/descramble logic 54-1. The descrambled data may be output to a CPU as unencrypted data.

Meanwhile, a path of encrypted data may be the same as that of FIG. 15, and thus, a description thereof will not be repeated here.

A computing system according to an exemplary embodiment of the inventive concept may be described below from the perspective of a path of normal data (or "unsecure data")/secure data including a bus. Here, the normal data may be data that does not need encryption, and the secure data may be data that needs encryption.

Figure 17:
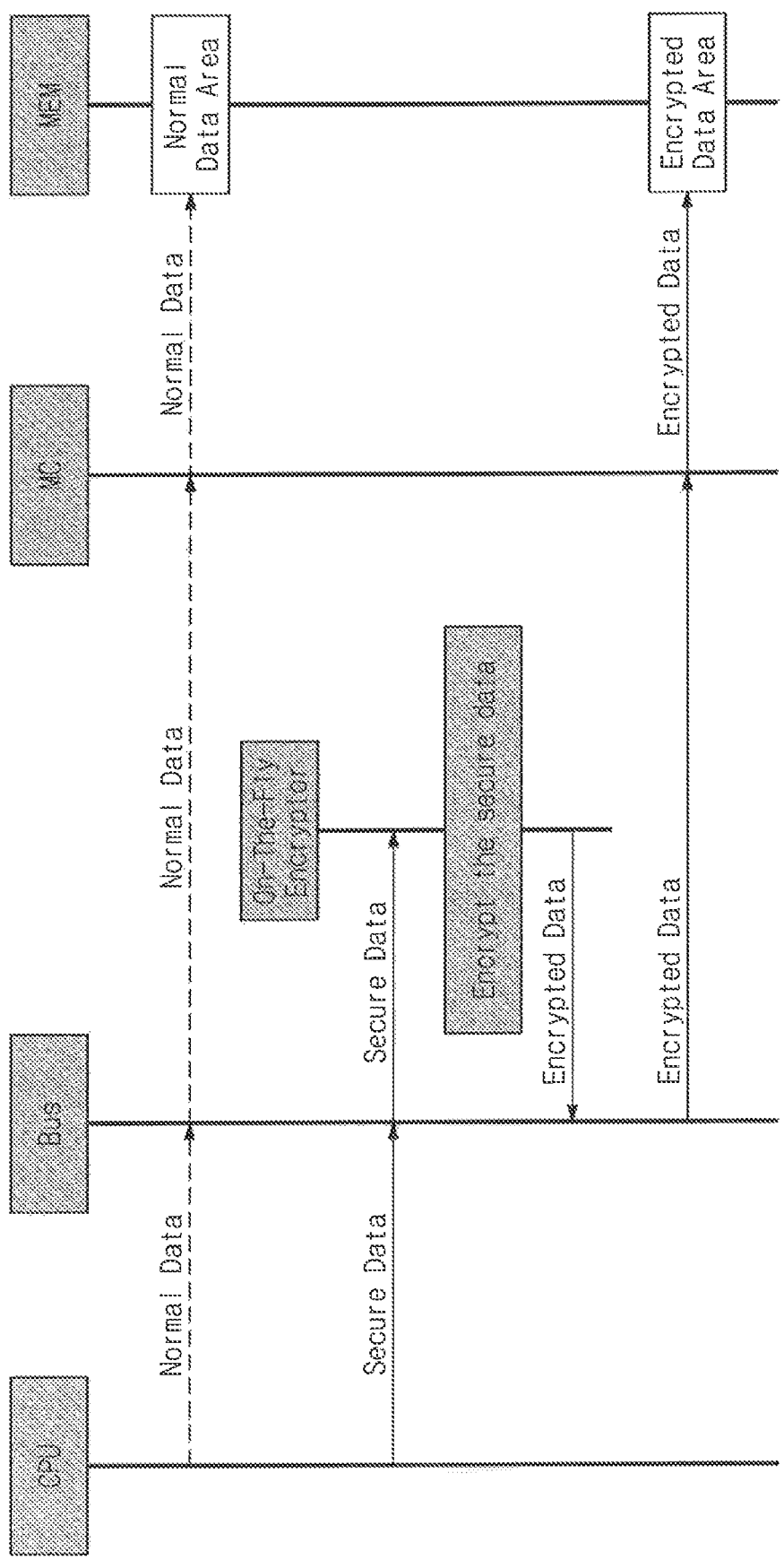
FIG. 17 illustrates a write path of normal/secure data in a computing system according to an exemplary embodiment of the inventive concept.

FIG. 17 illustrates a write path of normal/secure data in a computing system according to an exemplary embodiment of the inventive concept. Referring to FIG. 17, a computing system may separate a path for writing normal data from a path for writing secure data.

First, a write path of the normal data is as follows. Normal data that is output from a CPU may be sent to a memory controller MC through a bus. The memory controller MC may store the normal data in a normal data area of a corresponding memory MEM.

Next, a write path of the secure data is as follows. The secure data that is output from the CPU may be sent to an on-the-fly encryptor through the bus. Here, the on-the-fly encryptor may encrypt the secure data by using the encryption algorithm. The encrypted data may be sent to the memory controller MC through the bus. The memory controller MC may store the encrypted data in an encrypted data area of the corresponding memory MEM.

Figure 18:
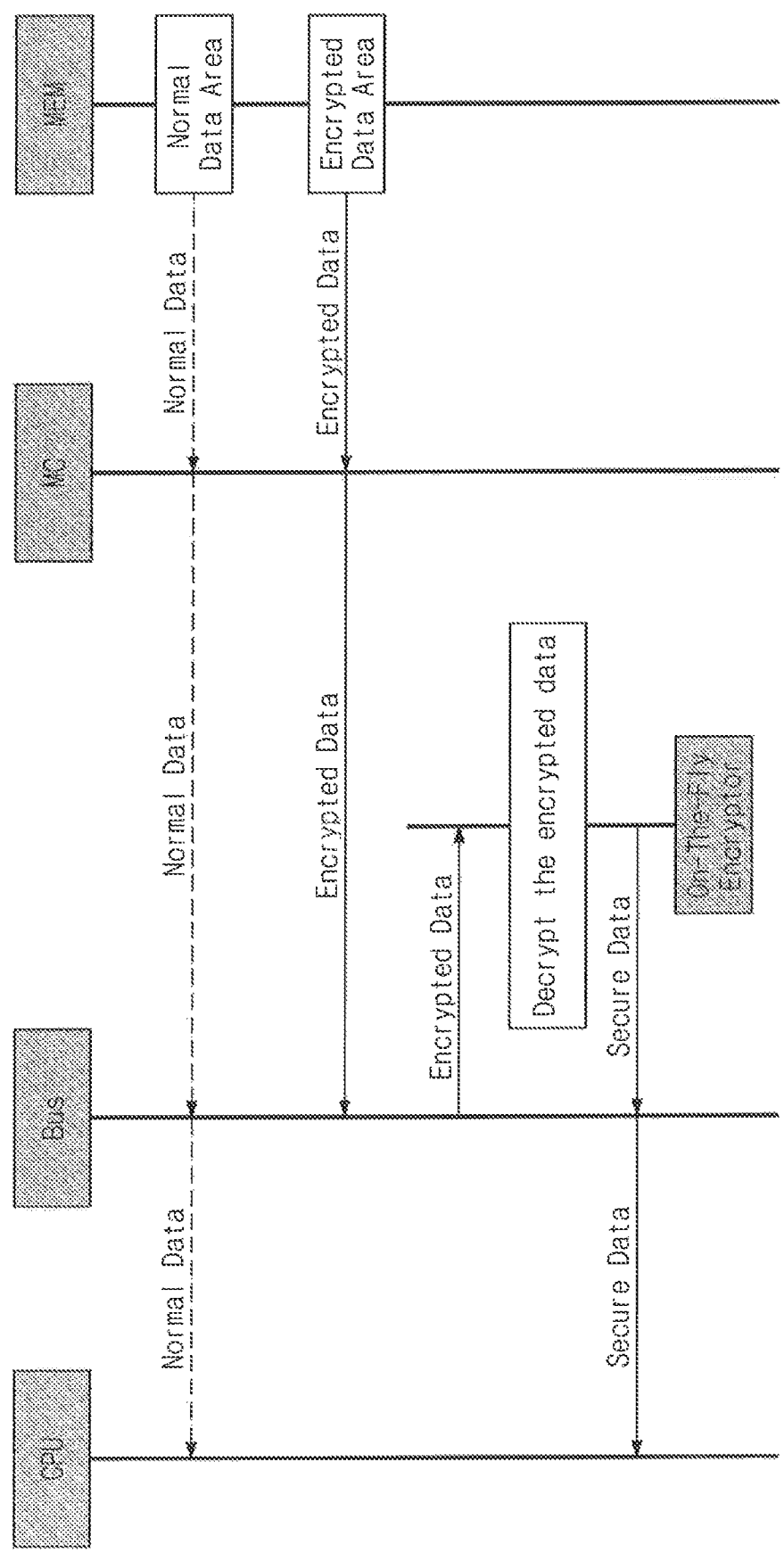
FIG. 18 illustrates a read path of normal/secure data in a computing system according to an exemplary embodiment of the inventive concept.

FIG. 18 illustrates a read path of normal/secure data in a computing system according to an exemplary embodiment of the inventive concept. Referring to FIG. 18, a computing system may separate a path for reading secure data from a path for reading normal data.

First, a read path of the normal data is as follows. The memory controller MC may read normal data stored in a normal data area of a memory MEM in response to a read request for the normal data and may send the read data to a CPU through a bus. Here, the read request may be received from the CPU through the bus.

Next, a read path of the secure data is as follows. An on-the-fly encryptor may transmit a memory read request to the memory controller MC through the bus in response to a read request for secure data. The memory controller MC may read encrypted data stored in an encrypted data area of a memory MEM in response to a memory read request and may transmit the read encrypted data to the on-the-fly encryptor through the bus. The on-the-fly encryptor may decrypt the encrypted data by using the encryption algorithm and may transmit the decrypted data, that is, secure data to the CPU through the bus.

Figure 19:
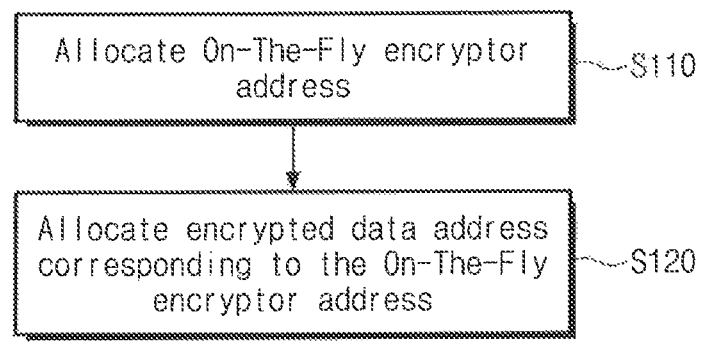
FIG. 19 illustrates an address allocation method of a computing system according to an exemplary embodiment of the inventive concept.

FIG. 19 is a flowchart illustrating an address allocation method of a computing system according to an exemplary embodiment of the inventive concept. Referring to FIG. 19, the address allocation method may include an operation of allocating an on-the-fly encryptor address (S110) and an operation of allocating an encrypted data address corresponding to the on-the-fly encryptor address (S120). Here, the encrypted data address may be fixed by a chip maker or may be variable by a chip user.

Figure 20:
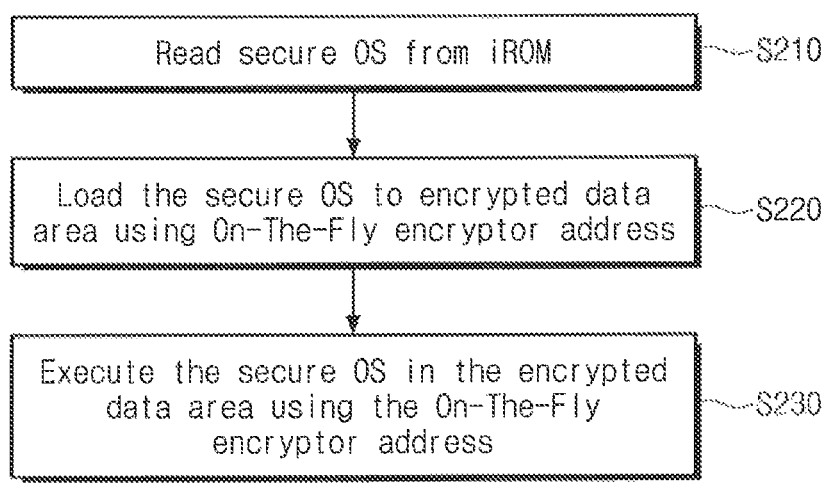
FIG. 20 illustrates a secure operating system driving method of a computing system according to an exemplary embodiment of the inventive concept.

FIG. 20 is a flowchart illustrating a secure operating system (OS) driving method of a computing system according to an exemplary embodiment of the inventive concept. The secure OS driving method of the host will be described with reference to FIG. 20. A secure OS stored in the internal ROM iROM may be read (S210). The read secure OS may be loaded on an encrypted data area of a main memory MEM by using an on-the-fly encryptor address (S220). A CPU may execute the secure OS of the encrypted data area by using the on-the-fly encryptor address (S230).

Meanwhile, a computing system according to an exemplary embodiment of the inventive concept may be implemented in the form of a package on package (POP).

Figure 21:
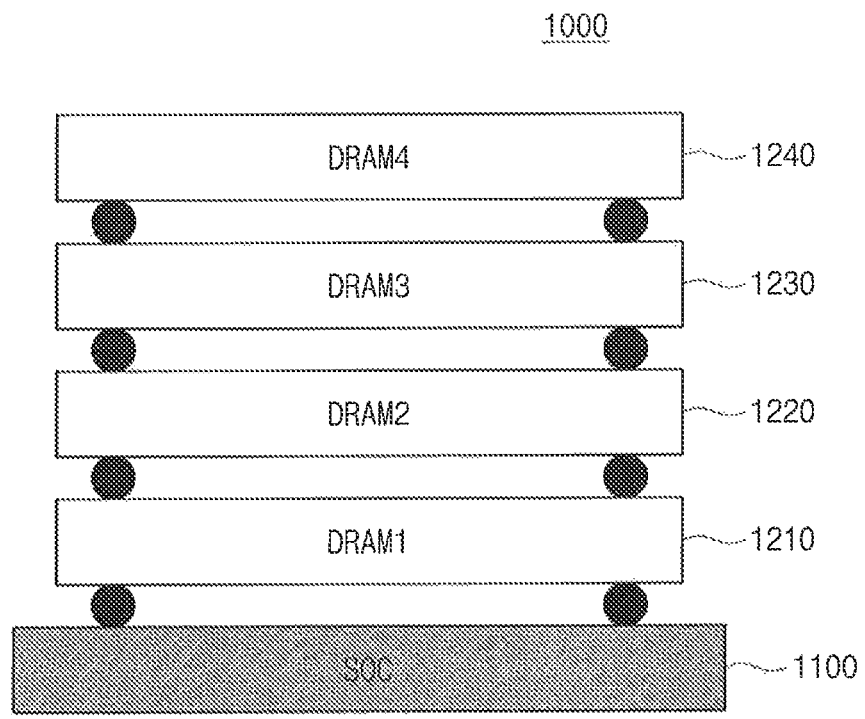
FIG. 21 illustrates a computing system package according to an exemplary embodiment of the inventive concept.

FIG. 21 illustrates a computing system package according to an exemplary embodiment of the inventive concept. Referring to FIG. 21, a computing system package 1000 may include a SOC 1100 and DRAM chips 1210, 1220, 1230, and 1240 sequentially stacked on the SOC 1100. Here, the SOC 1100 may be implemented the same as the SOC 100*b* illustrated in FIG. 9. Also, the stacked DRAM chips 1210, 1220, 1230, and 1240 may be implemented the same as the DRAMs 210*b*, 220*b*, 230*b*, and 240*b* illustrated in FIG. 9.

Meanwhile, the computing system according to an exemplary embodiment of the inventive concept may be applicable to a mobile device.

Figure 22:
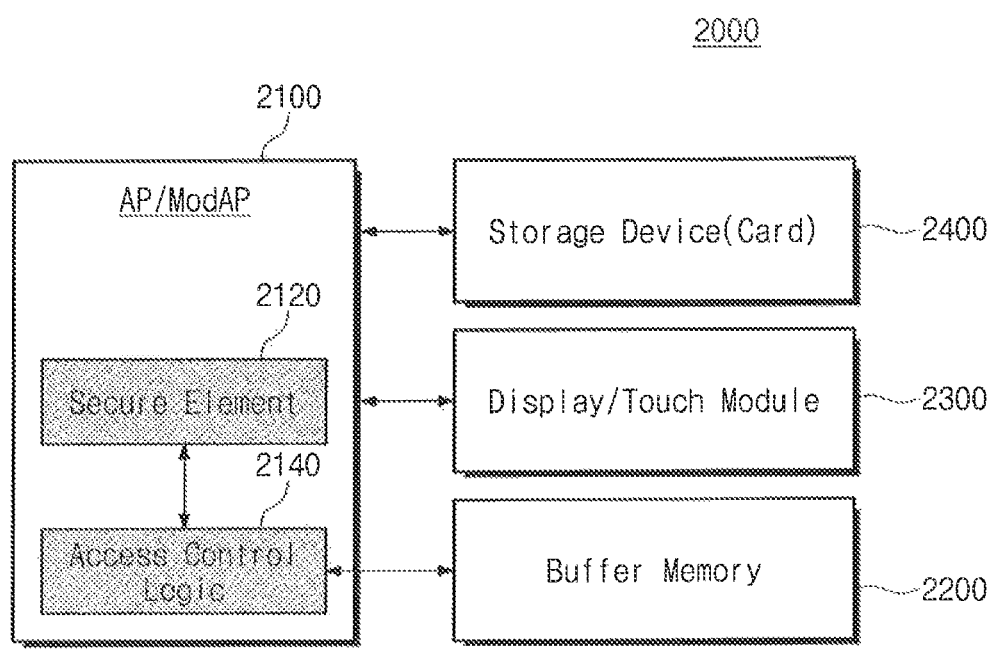
FIG. 22 illustrates a storage device according to an exemplary embodiment of the inventive concept.

FIG. 22 illustrates a mobile device 2000 according to an exemplary embodiment of the inventive concept. Referring to FIG. 22, the mobile device 2000 may include a processor (AP/ModAP) 2100, a buffer memory 2200, a display/touch module 2300, and a storage device 2400.

The processor 2100 may be implemented to control overall operations of the mobile device 2000 and wired/wireless communication with the outside. For example, the processor 2100 may be an application processor (AP), an integrated modem application processor (ModAP), or the like.

The processor 2100 may include a secure chip 2120 and access control logic 2140.

The secure chip 2120 may be implemented by software and/or with tamper resistant hardware, may permit high-level security, and may work to collaborate on trusted execution environment (TEE) of the processor 2100.

The secure chip 2120 may include a native operating system (OS), a secure storage device which is an internal data storage unit, an access control block which control the right to access the secure chip 1020, and a firmware update block for updating firmware of the secure chip 1020 and a security function block for performing ownership management, key management, digital signature, encryption/decryption, etc. For example, the secure chip 2120 may be a universal integrated circuit card (UICC) (e.g., USIM, CSIM, and ISIM), a subscriber identity module (SIM) card, an embedded secure elements (eSE), microSD, stickers, etc.

The access control logic 2140 may be implemented to control an access to an encrypted data area of the buffer memory 2200. The access control logic 2140 may be implemented to perform the same function as the access control logics 141 to 144 illustrated in FIG. 8 or may be implemented with the same configuration as the access control logics 141 to 144 illustrated in FIG. 8.

The buffer memory 2200 may be implemented to temporarily store data, which is needed to perform operations of the mobile device 2000. In an exemplary embodiment, the buffer memory 2200 may be implemented with a DRAM, a SDRAM, a magnetoresistive RAM (MRAM), etc. The buffer memory 2200 may include an unencrypted data area and an encrypted data area. Here, the encrypted data area may store data that is encrypted by the secure chip 2120.

The display/touch module 2300 may be implemented to display data processed by the processor 2100 or to receive data from a touch panel.

The storage device 2400 may be implemented to store data of a user. The storage device 2400 may be an embedded multimedia card (eMMC), a solid state drive (SSD), universal flash storage (UFS), etc. The storage device 2400 may include at least one nonvolatile memory device.

The nonvolatile memory device may be a NAND flash memory, a vertical NAND flash memory (VNAND), a NOR flash memory, a resistive random access memory (RRAM), a phase change memory (PRAM), an MRAM, a ferroelectric random access memory (FRAM), a spin transfer torque random access memory (STT-RAM), 3Dxpoint Memory etc.

Furthermore, the nonvolatile memory may be implemented to have a three-dimensional (3D) array structure. In an exemplary embodiment of the inventive concept, a 3D memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The circuit related on an operation of memory cells may be located in a substrate or on a substrate. The term "monolithic" means that layers of each level of the array are directly deposited on the layers of each underlying level of the array.

In an exemplary embodiment of the inventive concept, the 3D memory array includes vertical NAND strings that are vertically oriented such that at least one memory cell is located over another memory cell. The at least one memory cell may comprise a charge trap layer. Each vertical NAND string may include at least one select transistor located over memory cells. At least one selection transistor may have the same structure as memory cells, and be monolithically formed together with memory cells.

The three-dimensional memory array is formed of a plurality of levels and has word lines or bit lines shared among levels. The following patent documents, which are hereby incorporated by reference, describe suitable configurations for three-dimensional memory arrays, in which the three-dimensional memory array is configured as a plurality of levels, which is applied by Samsung Electronics Co., with word lines and/or bit lines shared between levels: U.S. Pat. Nos. 7,679,133; 8,553,466; 8,654,587; 8,559,235; and US Pat. Pub. No. 2011/0233648. The nonvolatile memory according to an exemplary embodiment of the inventive concept may be applicable to a charge trap flash (CTF) in which an insulating layer is used as a charge storage layer, as well as a flash memory device in which a conductive floating gate is used as a charge storage layer.

The mobile device 2000 according to an exemplary embodiment of the inventive concept may separate a secure data path from a normal data path, thereby markedly improving a security function while maintaining the overall performance.

Meanwhile, a computing system according to an exemplary embodiment of the inventive concept may be described below from the perspective of an access of a master.

Figure 23:
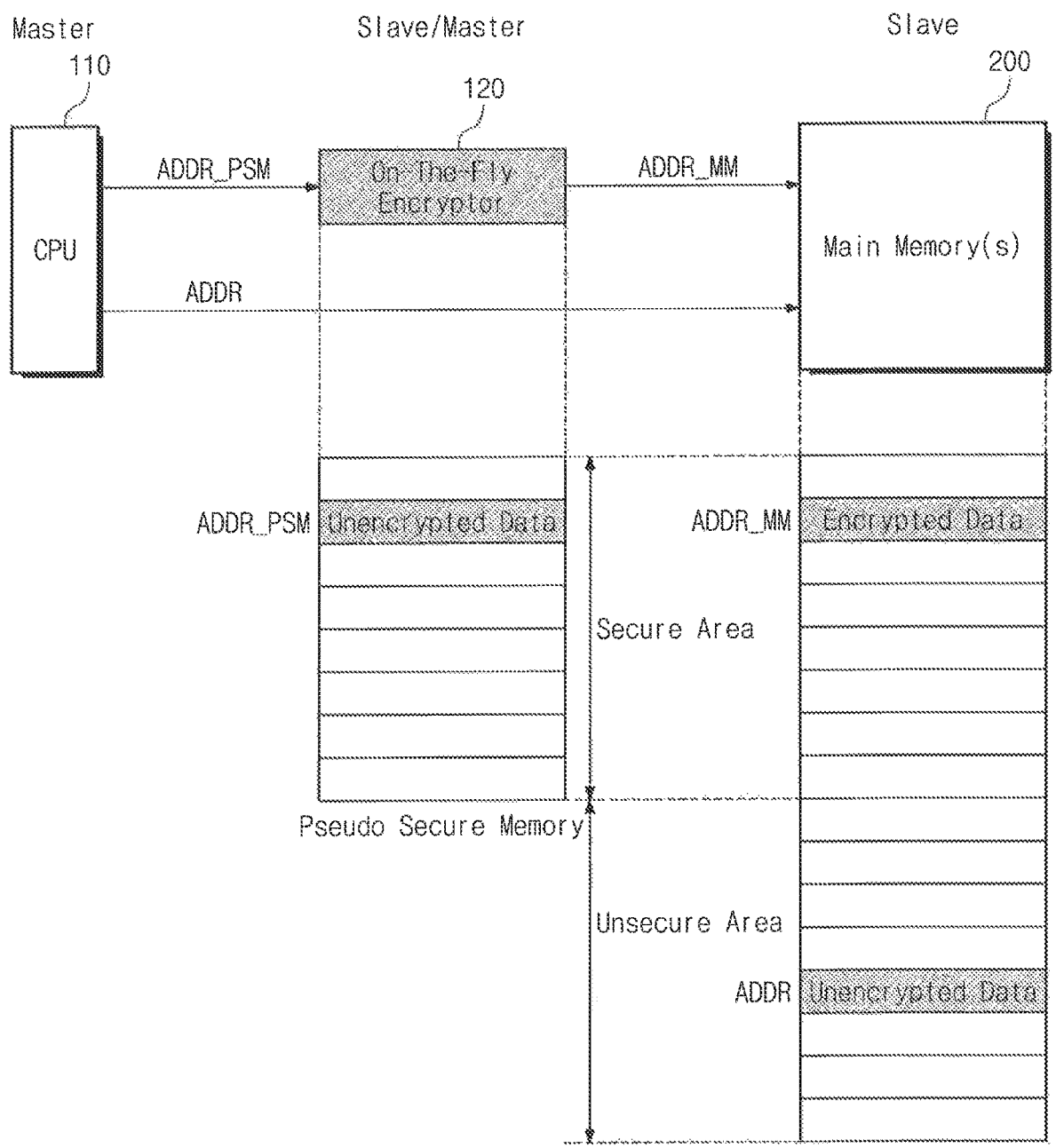
FIG. 23 illustrates a computing system according to an exemplary embodiment of the inventive concept, from the perspective of a master device accessing a slave device.

FIG. 23 is a drawing for describing a computing system according to an exemplary embodiment of the inventive concept, from the perspective of an access of a master device to a slave device. Referring to FIG. 23, a CPU 110 is a master with regard to the on-the-fly encryptor 120 and a main memory 200, the on-the-fly encryptor 120 is a slave with regard to the CPU 110 and a master with regard to the main memory 200, and the main memory 200 is a slave with regard to the on-the-fly encryptor 120.

The CPU 110 may be implemented to access the on-the-fly encryptor 120 by using a pseudo secure memory address ADDR_PSM. It may look as if a secure data is stored in a pseudo secure memory address (ADDR_PSM) space. Here, the pseudo secure memory address space may correspond to a secure area of the main memory 200.

Also, the CPU 110 may be implemented to access an unencrypted data area of the main memory 200, that is, an unsecure area by using a normal address ADDR.

The on-the-fly encryptor 120 may be implemented to access an encrypted data area of the main memory 200, that is, a secure area by using a main memory address ADDR_MM. Unencrypted data stored in the pseudo secure memory address space may be stored in the encrypted data area of the main memory 200 after being encrypted by the on-the-fly encryptor 120.

In FIGS. 1 to 23, the embodiments are exemplified as the on-the-fly encryptor 120 performing an encryption function is situated on the outside of the CPU 110. However, the embodiments are not limited thereto. The on-the-fly encryptor 120 may be situated in the interior of the CPU 120.

Figure 24:
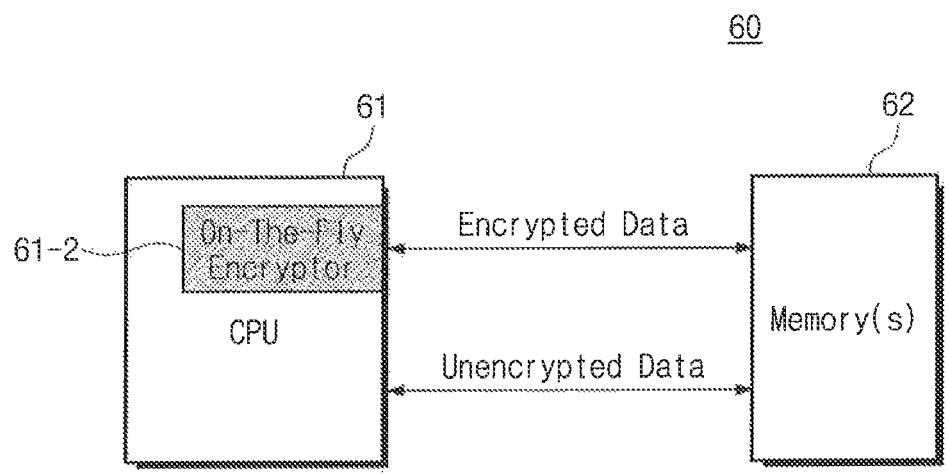
FIG. 24 illustrates a computing system according to an exemplary embodiment of the inventive concept.

FIG. 24 illustrates a computing system 60 according to another embodiment of the inventive concept. Referring to FIG. 24, the computing system 60 may include a CPU 61 and a main memory 62. The CPU 61 may include an on-the-fly encryptor 61-2 that encrypts or decrypts data in real time. The on-the-fly encryptor 61-2 may be designed to be viewed as a pseudo secure memory internally. Data that needs security may be exchanged with the main memory 62 after being encrypted/decrypted by the on-the-fly encryptor 61-2. Normal data may be exchanged normally with the main memory 62.

In an exemplary embodiment, the on-the-fly encryptor 61-2 may be connected to the main memory 62 through a dedicated data path. In an exemplary embodiment, the on-the-fly encryptor 61-2 may store data in the main memory 62 through a memory controller (not illustrated) or may read data from the main memory 62 through the memory controller.

According to embodiments of the inventive concept, a path for transmitting encrypted data may be completely separated from a path for transmitting unencrypted data. To this end, a virtual secure memory may be created on an address space. If a CPU writes data in the virtual secure memory, hardware may store the data in a specific area of a DRAM after automatically encrypting the data. In the case where the CPU intents to read data, the hardware may send the data to the CPU after automatically decrypting the data read from a specific area of the DRAM. Accordingly, a portion of data may be protected through encryption without affecting the overall performance of system.

A computing system according to an exemplary embodiment of the inventive concept may minimize reduction of performance by separating a transmission path of encrypted data between a CPU and a main memory from a transmission path of unencrypted data therebetween.

Also, the computing system according to an exemplary embodiment of the inventive concept may not cause an additional latency associated with transmission of unencrypted data by sending encrypted data through a path that is different from that of the unencrypted data.

In addition, compared to a conventional computing system, the computing system according to an exemplary embodiment of the inventive concept may relatively reduce a chip size by using only one on-the-fly encryptor for data encryption while supporting an interleaving function.

The computing system according to an exemplary embodiment of the inventive concept may also improve a data-related security function by encrypting a portion of data while not influencing the overall performance of the computing system.

Figure 25:
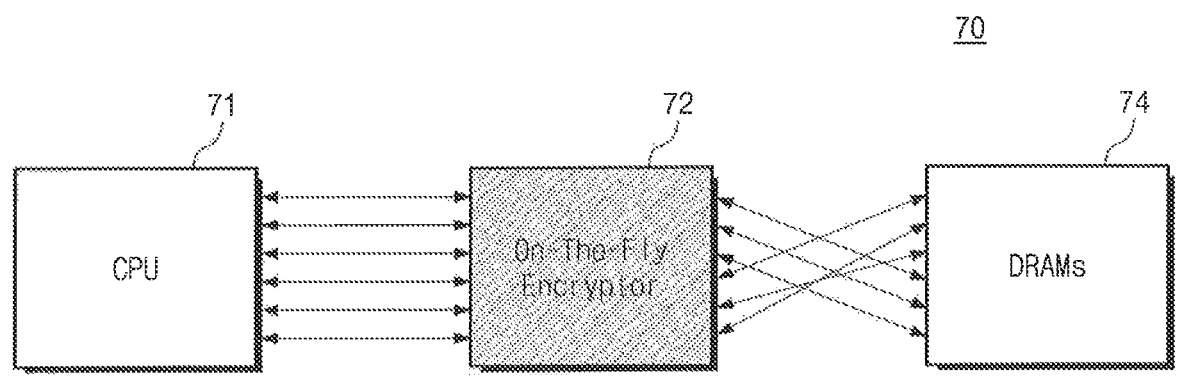
FIG. 25 illustrates a computing system 70, according to another embodiment of the inventive concept.

FIG. 25 illustrates a computing system 70, according to another embodiment of the inventive concept. Referring to FIG. 25, the computer system 70 may include a CPU 71, an on-the-fly encryptor 72, and a plurality of DRAMs 74. The on-the-fly encryptor 72 may be implemented to process transactions (encryption/decryption operations) from the CPU 71 and/or the DRAMs 74. Here, the transactions may be issued by the CPU 71. In an exemplary embodiment, the transactions may be write transactions or read transactions. Here, data encryption operations may be performed on the write transactions, and data decryption operations may be performed on the read transactions.

In an exemplary embodiment, the transactions may be simultaneously processed by the on-the-fly encryptor 72. In another embodiment, the transactions may be processed in parallel by the on-the-fly encryptor 72.

FIG. 25 shows six transactions, but embodiments of the inventive concept may not be limited thereto.

In an exemplary embodiment, the on-the-fly encryptor 72 may receive transactions from the CPU 71 and may issue transactions for DRAM corresponding to the DRAMs 74.

In an exemplary embodiment, data input and output to and from the DRAMs 74 may be interleaved. In another embodiment, data input and output to and from the DRAMs 74 may not be interleaved.

Figure 26:
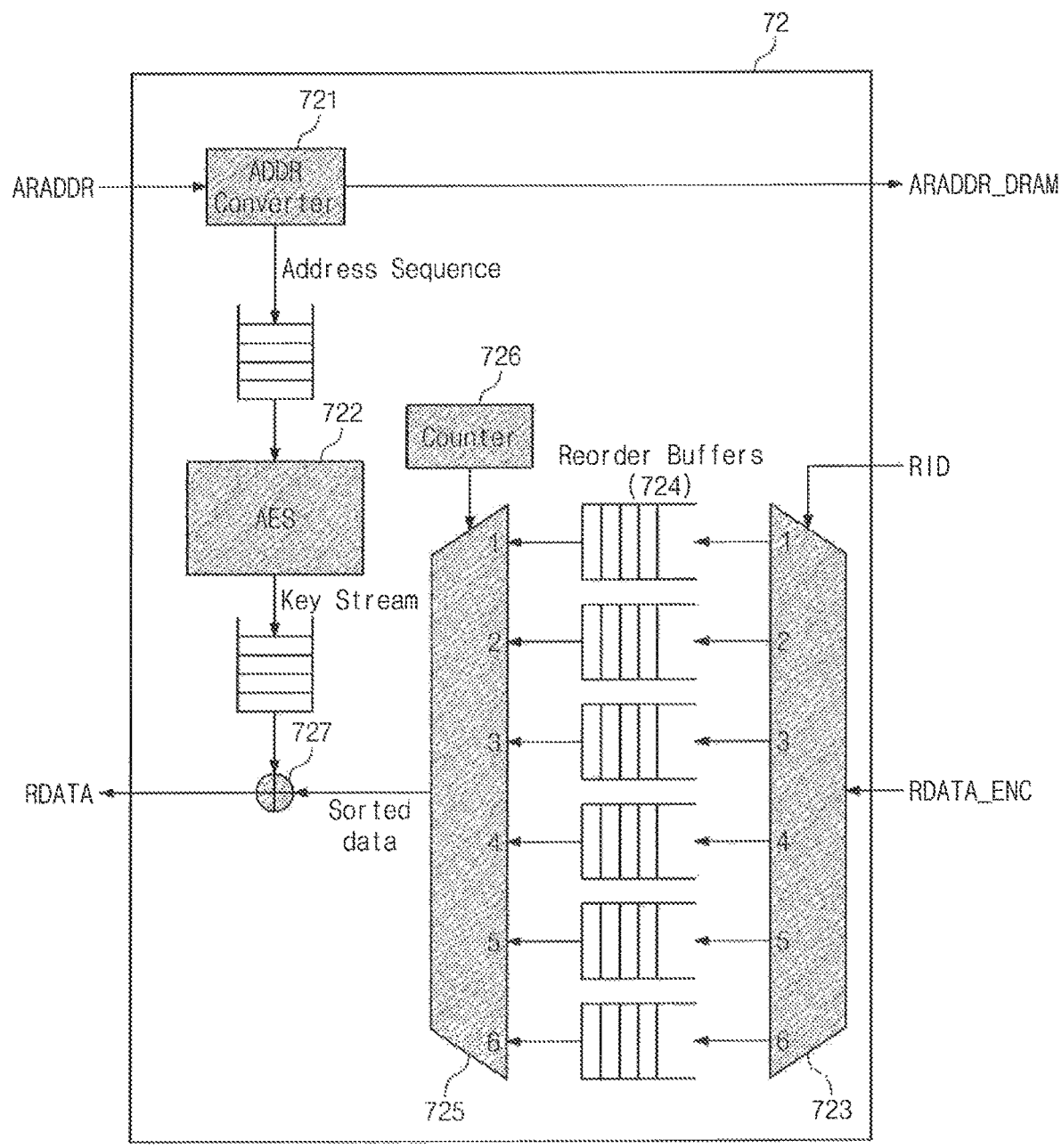
FIG. 26 illustrates an exemplary embodiment of the on-the-fly encryptor 72 illustrated in FIG. 25.

FIG. 26 illustrates an exemplary embodiment of the on-the-fly encryptor 72 illustrated in FIG. 25. Referring to FIG. 26, the on-the-fly encryptor 72 may include an address converter 721, an encryption circuit (AES) 722, a de-multiplexer 723, reorder buffers 724, a multiplexer 725, a counter 726, and an XOR operator 727.

The address converter 721 may be implemented to convert an address ARADDR received from the CPU 71 into a DRAM dedicated address ARADDR_DRAM. Also, the address converter 721 may be implemented to generate an address sequence by using the address ARADDR included in a transaction. In an exemplary embodiment, the size of the address sequence may be 64 bits. However, according to embodiments of the inventive concept, the size of the address sequence may not be limited thereto.

The encryption circuit 722 may be implemented to receive an address sequence from the address converter 721 and to generate a key stream corresponding to an address based on an encryption algorithm. In an exemplary embodiment, the encryption algorithm may include an advanced encryption standard (AES) algorithm. However, according to embodiments of the inventive concept, the encryption algorithm may not be limited thereto. In an exemplary embodiment, a key value of the key stream may have a size of 128 bits. However, according to embodiments of the inventive concept, the size of the key value may not be limited thereto.

The multiplexer 723 may be implemented to receive data from the DRAMs 74 and to transfer the received data provided to the reorder buffers 724, which correspond to a tag value included in the received data, in response to a read identifier RID. Here, the read identifier RID may be an identification number of a DRAM that transfers the received data. In an exemplary embodiment, the read identifier RID may have a size of 3 bits. However, according to embodiments of the inventive concept, the size of the read identifier RID may not be limited thereto.

Even though data RDATA_ENC is transferred from the DRAMs 74 in a state where an encryption order is changed, the received data RDATA_ENC may be aligned and transferred to the corresponding reorder buffers 724, based on a selection operation of the de-multiplexer 723. Here, each of the reorder buffers 724 may be connected to the multiplexer 725 to be suitable for an encryption order.

The multiplexer 725 may be implemented to select values stored in the reorder buffers 724 in order to be suitable for the encryption order, in response to a count value. Here, a count value may be generated by the counter 726. In an exemplary embodiment, the count value may have a size of 3 bits. However, according to embodiments of the inventive concept, the size of the count value may not be limited thereto.

The XOR operator 727 may be implemented to perform a decryption operation by performing an XOR operation on a key value from the encryption circuit 722 and an output value of the multiplexer 725. Decrypted data RDATA may be transferred to the CPU 71 as read data.

Figure 27:
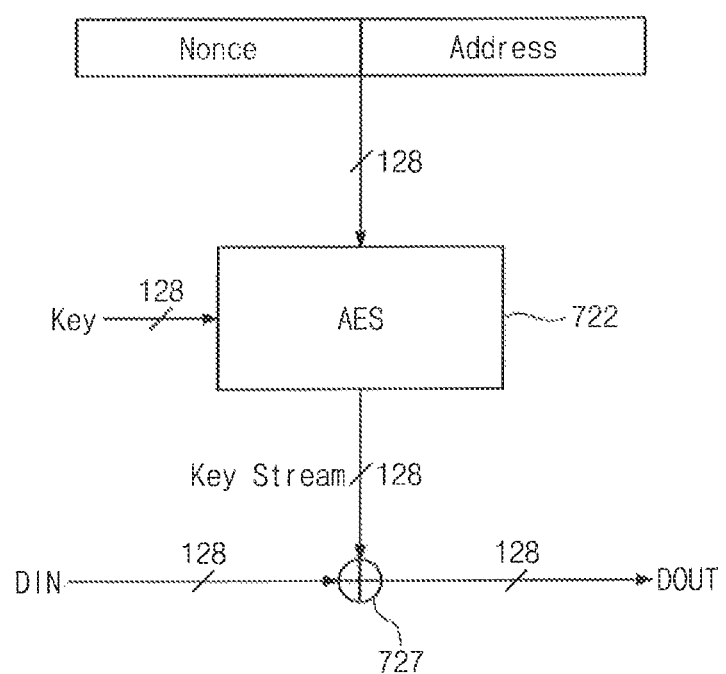
FIG. 27 illustrates an encryption/decryption process, according to an exemplary embodiment of the inventive concept.

FIG. 27 illustrates an encryption/decryption process, according to an exemplary embodiment of the inventive concept. Referring to FIG. 27, the encryption circuit 722 may be implemented to receive a 128-bit nonce and address and a 128-bit key and to generate a 128-bit key stream based on an encryption algorithm. Here, the nonce and key may be a value that is determined in advance.

In an exemplary embodiment, the address may be all or part of the received address ARADDR.

The XOR operator 727 may be implemented to generate 128-bit output data DOUT by performing an XOR operation on a 128-bit key stream from the encryption circuit 722 and 128-bit input data DIN.

Meanwhile, an exemplary embodiment is exemplified as each of pieces of data (the nonce and address, the key, the key stream, the input data, and the output data) needed for an operation process in FIG. 27 has a size of 128 bits. However, embodiments of the inventive concept may not be limited thereto.

Meanwhile, in FIG. 26, the on-the-fly encryptor 72 performs data reordering at a data input stage to set an order of the encryption operation. However, embodiments of the inventive concept may not be limited thereto. According to embodiments of the inventive concept, a key stream corresponding to received data may be output to correspond to an order of the encryption operation.

Figure 28:
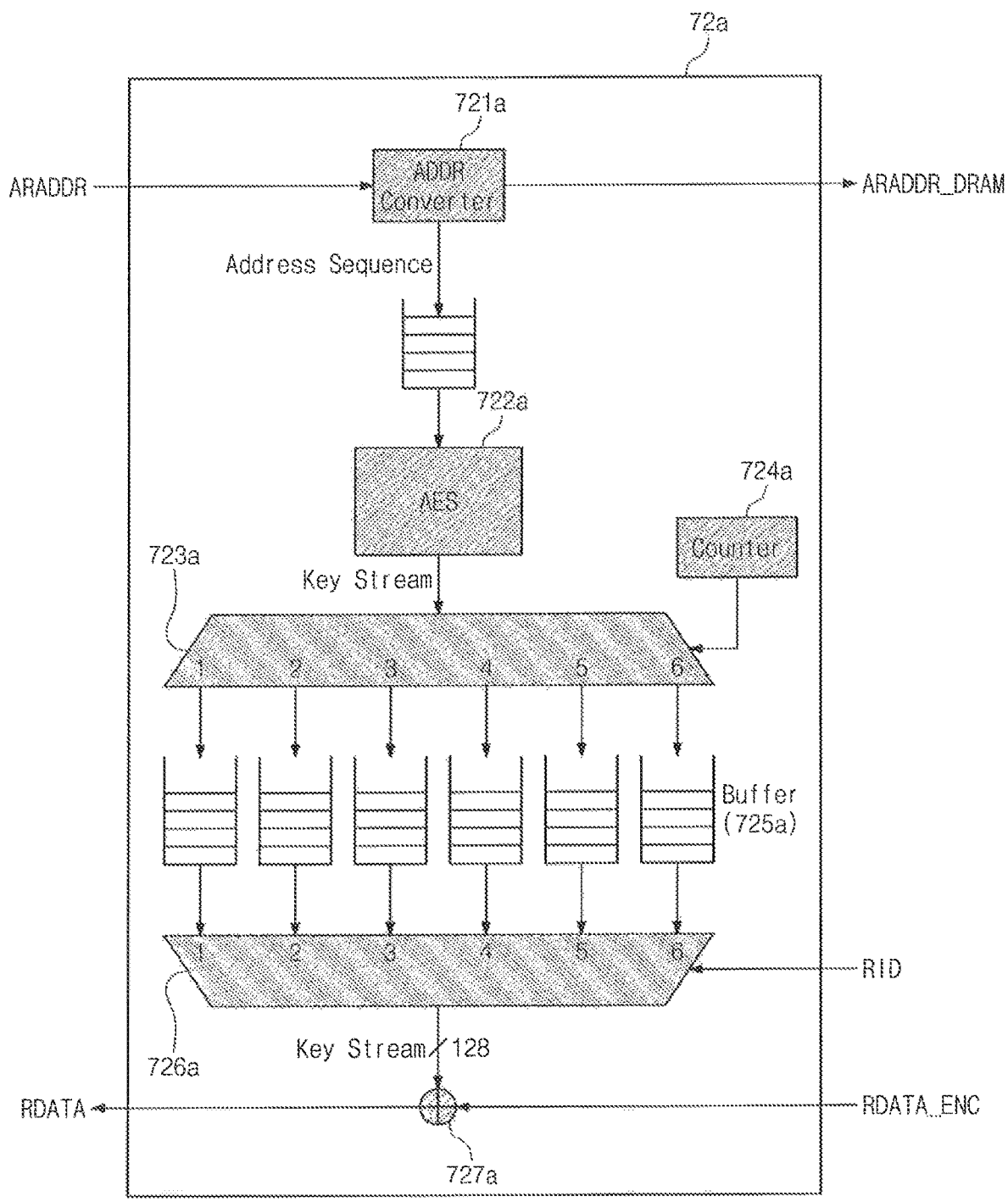
FIG. 28 illustrates another embodiment of the on-the-fly encryptor 72 illustrated in FIG. 25.

FIG. 28 illustrates another embodiment of the on-the-fly encryptor 72 illustrated in FIG. 25. Referring to FIG. 28, an on-the-fly encryptor 72a may include an address converter 721a, an encryption circuit (AES) 722a, a de-multiplexer 723a, a counter 724a, buffers 725a, a multiplexer 726a, and an XOR operator 727a.

The address converter 721a and the encryption circuit 722a may be implemented the same as the address converter 721 and the encryption circuit 722 illustrated in FIG. 26.

The de-multiplexer 723a may be implemented to select the buffers 725a corresponding to key streams output from the encryption circuit 722a in response to a count value. A key value to be used for encryption/decryption may be stored in the selected one of the buffers 725a. Here, the count value may be generated by the counter 724a.

The multiplexer 726a may be implemented to output a key value stored in any one of the buffers 725a to the XOR operator 727a in response to the read identifier RID.

The XOR operator 727a may be implemented to perform a decryption operation by performing an XOR operation on a key value from the multiplexer 726a and data RDATA_ENC from the DRAMs 74.

Meanwhile, according to an exemplary embodiment of the inventive concept, an on-the-fly encryptor may be applied to a system-on-chip (SOC) of a multi-layer bus (or a multi-level bus) structure.

Figure 29:
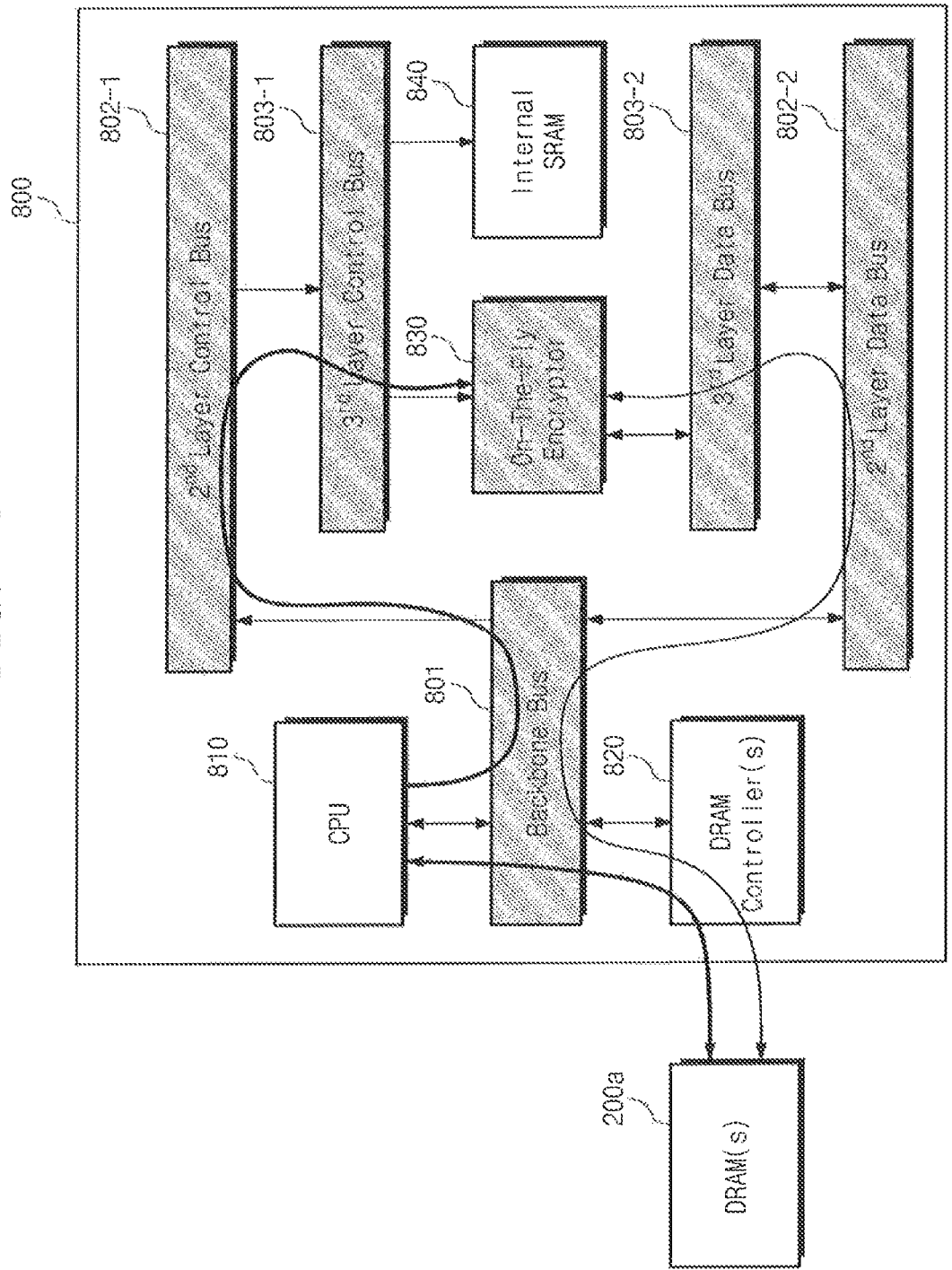
FIG. 29 illustrates a system-on-chip 800, according to an exemplary embodiment of the inventive concept.

FIG. 29 illustrates a system-on-chip 800, according to an exemplary embodiment of the inventive concept. Referring to FIG. 29, the system-on-chip 800 may include a CPU 810 connected to a first layer bus, that is, a backbone bus 801, at least one DRAM controller 820, a second layer control bus 802-1 connected to the first layer bus 801, a second layer data bus 802-2 connected to the first layer bus 801, third layer control buses 803-1 connected to the second layer control bus 802-1, a third layer data bus 803-2 connected to the second layer data bus 802-2, an on-the-fly encryptor 830 connected to the third layer control bus 803-1 and the third layer data bus 803-2, and an internal SRAM 840.

In an exemplary embodiment, illustrated in FIG. 29, the control buses 802-1 and 803-1 are formed of two layers. However, it should be understood that control buses are formed of three or more layers. In an exemplary embodiment, illustrated in FIG. 29, the data buses 802-2 and 803-2 are formed of two layers. However, it should be understood that data buses are formed of three or more layers.

In an exemplary embodiment, the on-the-fly encryptor 830 may receive a transaction from the CPU 810 through the first layer bus 801, the second layer control bus 802-1, and the third layer control bus 803-1. In an exemplary embodiment, the on-the-fly encryptor 830 may transfer a transaction for DRAM corresponding to the received transaction to the DRAM controller 820 through the third layer control bus 803-1, the second layer control bus 802-1, and the first layer bus 801. In another embodiment, the on-the-fly encryptor 830 may transfer the transaction for DRAM corresponding to the received transaction to the DRAM controller 820 through a layer control bus that is not illustrated in FIG. 29.

In an exemplary embodiment, the on-the-fly encryptor 830 may receive write data from the CPU 810 through the first layer bus 801, the second layer data bus 802-2, and the third layer data bus 803-2. In an exemplary embodiment, the on-the-fly encryptor 830 may encrypt the write data and may transfer the encrypted data to the DRAM controller 820 through the third layer data bus 803-2, the second layer data bus 802-2, and the first layer bus 801. In another embodiment, the on-the-fly encryptor 830 may transfer the encrypted data to the DRAM controller 820 through a layer data bus that is not illustrated in FIG. 29. A data path for a read operation may be implemented to be similar to the above-described data path of the write operation.

As illustrated in FIG. 29, two kinds of data paths may exist between the CPU 810 and at least one DRAM(s) 200a. The first data path is a path in which data are directly exchanged between the CPU 810 and the DRAM controller 820 through the first layer bus 801. The second data path is a path that passes through the on-the-fly encryptor 830 between the CPU 810 and the DRAM controller 820 through the first layer bus 801, the second layer buses 802-1 and 802-2, and the third layer buses 803-1 and 803-2.

Figure 30:
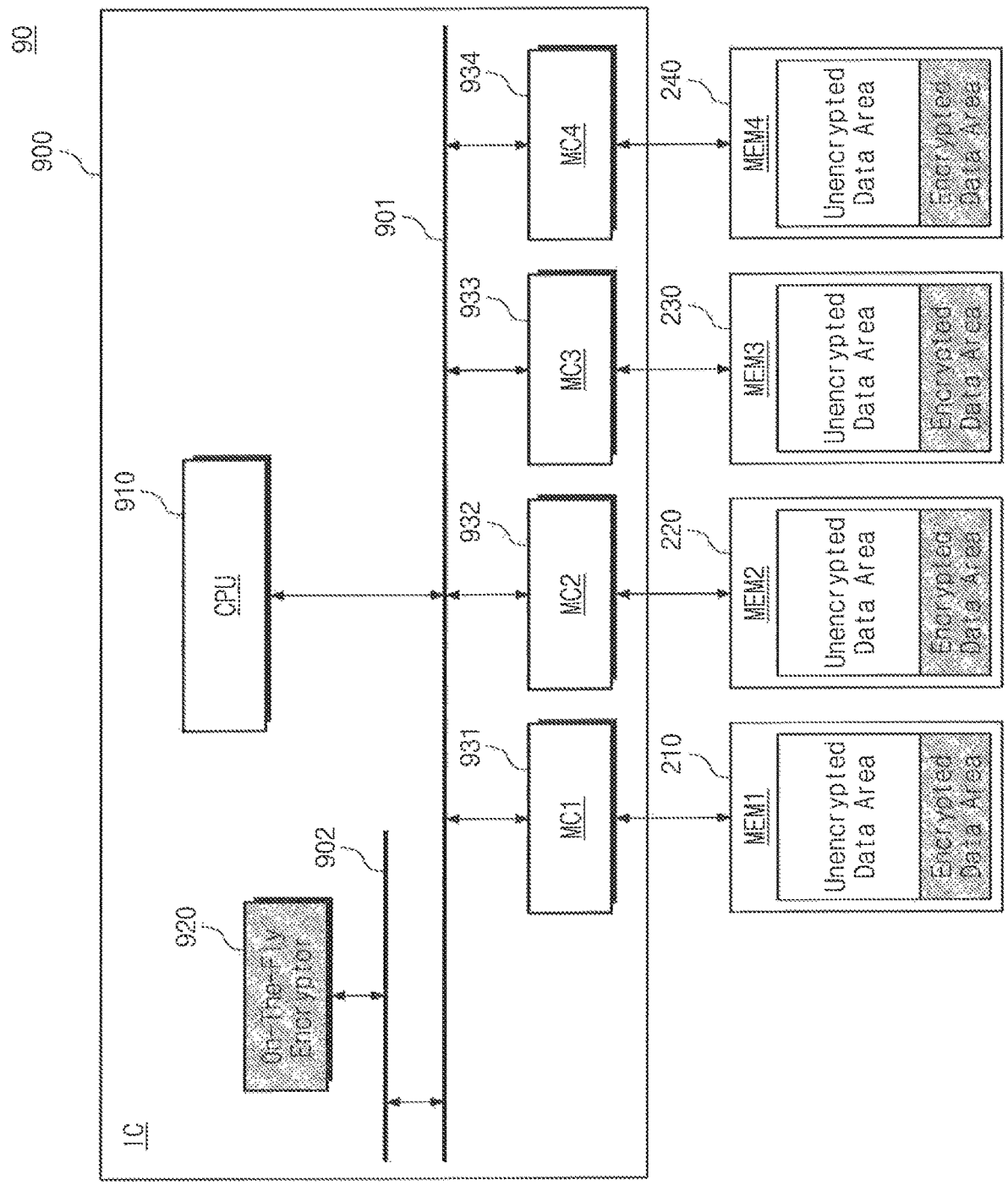
FIG. 30 illustrates a computing system 90 including an integrated circuit 900 of a multi-layer bus structure, according to an exemplary embodiment of the inventive concept.

FIG. 30 illustrates a computing system 90 including an integrated circuit 900 of a multi-layer bus structure, according to an exemplary embodiment of the inventive concept. Referring to FIG. 30, the computing system 90 may include the integrated circuit 900 and a plurality of memory devices 210, 220, 230, and 240.

Compared to the integrated circuit 100 illustrated in FIG. 1, the integrated circuit 900 includes an on-the-fly encryptor 920 connected to a multi-layer bus 902. The multi-layer bus 902 may be connected to a first layer bus 901. One multi-layer bus 902 is illustrated in FIG. 30, but the integrated circuit 900 may include two or more multi-layer buses. A CPU 910 and a plurality of memory controllers 931, 932, 934, and 934 may be connected to the first layer bus 901.

Meanwhile, according to an exemplary embodiment of the inventive concept, an on-the-fly encryptor may be applied to implement simply a trusted execution environment in an application processor.

According to an exemplary embodiment of the inventive concept, to minimize reduction in performance, a computing system may be implemented such that a transfer path for data needing encryption and a transfer path for data not needing encryption are completely separated from each other. To this end, a virtual secure memory may be created on an address space. When a CPU writes data in the virtual secure memory, hardware may automatically encrypt the data and may store the encrypted data in a specific area of a DRAM. When the CPU reads data, the hardware may automatically read data from the specific area of the DRAM, may decrypt the read data, and may transfer the decrypted data to the CPU. Accordingly, it may be possible to protect only data needing encryption while not having an influence on the whole performance of system.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An operation method of a computing system including a central processing unit (CPU), an on-the-fly encryptor connected to the CPU through a system bus, and a memory controller connected to the CPU through the system bus, the operation method comprising:
   transmitting, by the CPU, secure data to the on-the fly encryptor through the system bus;
   encrypting, by the on-the-fly encryptor, the secure data received through the system bus;
   storing, by the memory controller, the encrypted data, which is received through the system bus, in an encryption data area of a memory device;
   transmitting, by the CPU, normal data to the memory controller through the system bus, without passing the on-the-fly encryptor; and
   storing, by the memory controller, the normal data received through the system bus in a non-encryption data area of the memory device.

2. The operation method of claim 1, further comprising:
   reading, by the memory controller, the encrypted data stored in the encryption data area;
   sending, by the memory controller, the encrypted data to the on-the-fly encryptor through the system bus;
   decrypting, by the on-the-fly encryptor, the encrypted data to generate the secure data;
   sending, by the on-the-fly encryptor, the secure data to the CPU through the system bus;
   reading, by the memory controller, the normal data stored in the non-encryption data area; and
   sending, by the memory controller, the normal data to the CPU through the system bus, without passing the on-the-fly encryptor.

3. The operation method of claim 1, further comprising:
   sending, by the CPU, a secure read request to the on-the-fly encryptor through the system bus;
   sending, by the on-the-fly encryptor, a memory read request to the memory controller through the system bus, in response to the secure read request;
   sending, by the memory controller, the encrypted data from the encryption data area of the memory device to the on-the-fly encryptor through the system bus, in response to the memory read request;
   decrypting, by the on-the-fly encryptor, the encrypted data to generate the secure data; and
   sending, by the on-the-fly encryptor, the secure data to the CPU through the system bus.

4. The operation method of claim 3, further comprising:
   sending, by the CPU, a normal read request to the memory controller through the system bus, without passing the on-the-fly encryptor; and
   sending, by the memory controller, the normal data from the non-encryption data area of the memory device to the CPU through the system bus, without passing the on-the-fly encryptor.

5. The operation method of claim 1, further comprising:
   generating, by the on-the-fly encryptor, an encryption data address by adding an offset address to an address, which is received from the CPU through the system bus,
   wherein the encryption data address corresponds to the encryption data area.

6. The operation method of claim 1, further comprising:
   blocking a direct access of the CPU to the encryption data area without passing the on-the-fly encryptor.

7. The operation method of claim 1, wherein the computing system further comprises an intellectual property (IP) block connected to the system bus,
   wherein the operation method further comprises:
   sending, by the IP block, a secure read request to the on-the-fly encryptor through the system bus;
   sending, by the on-the-fly encryptor, a memory read request to the memory controller through the system bus, in response to the secure read request;
   sending, by the memory controller, the encrypted data from the encryption data area of the memory device to the on-the-fly encryptor through the system bus, in response to the memory read request;
   decrypting, by the on-the-fly encryptor, the encrypted data; and
   sending, by the on-the-fly encryptor, the decrypted data to the IP block through the system bus.

8. The operation method of claim 1, wherein the storing, by the memory controller, the normal data received through the system bus in a non-encryption data area of the memory device comprises:
   scrambling, by the memory controller, the normal data; and
   storing, by the memory controller, the scrambled normal data in the non-encryption data area.

9. An operation method of a computing system including a central processing unit (CPU), an on-the-fly encryptor connected to the CPU through a system bus, and a memory controller connected to the CPU through the system bus, the operation method comprising:
   sending, by the CPU, a secure read request to the on-the-fly encryptor through the system bus;
   sending, by the on-the-fly encryptor, a memory read request to the memory controller in response to the secure read request;
   reading, by the memory controller, an encrypted data from an encryption data area of a memory device in response to the memory read request;
   sending, by the memory controller, the encrypted data to the on-the-fly encryptor through the system bus;
   decrypting, by the on-the-fly encryptor, the encrypted data to generate a secure data;
   sending, by the on-the-fly encryptor, the secure data to the CPU through the system bus;
   sending, by the CPU, a normal read request to the memory controller without passing the on-the-fly encryptor;
   reading, by the memory controller, normal data from a non-encryption data area of the memory device in response to the normal read request; and sending, by the memory controller, the normal data to the CPU through the system bus, without passing the on-the-fly encryptor.

10. The operation method of claim 9, further comprising: blocking a direct access of the CPU to the encryption data area without passing the on-the-fly encryptor.

11. The operation method of claim 9, wherein the reading, by the memory controller, normal data comprises de-scrambling scrambled data from the non-encryption data area to generate the normal data.

12. A computing system comprising:
a system bus;
a central processing unit (CPU) connected to the system bus;
an on-the-fly encryptor connected to the system bus;
a memory controller connected to the system bus; and
a memory device including an encryption data area and a non-encryption data area,
wherein when the CPU accesses the encryption data area of the memory device;
the CPU is configured to access the on-the-fly encryptor through the system bus;
the on-the-fly encryptor is configured to access the memory controller through the system bus in response to the access of the CPU; and
the memory controller is configured to access the encryption data area in response to the access of the on-the-fly encryptor,
when the CPU accesses the non-encryption data area of the memory device;
the CPU is further configured to directly access the memory controller without passing the on-the-fly encryptor; and
the memory controller is further configured to access the non-encryption data area of the memory device in response to the direct access of the CPU.

13. The computing system of claim 12, further comprising:
an access control logic being between the memory controller and the system bus, and configured to block a direct access of the CPU to the encryption data area of the memory device without passing the on-the-fly encryptor.

14. The computing system of claim 12, wherein the CPU is further configured to access the encryption data area and the non-encryption data area of the memory device based on a system address space,
the system address space includes a pseudo secure memory address space and a memory address space, and
the memory address space includes a space corresponding to the encryption data area and a space corresponding to the non-encryption data area.

15. The computing system of claim 14, wherein the CPU is further configured to access the encryption data area of the memory device by using an address of the pseudo secure memory address space, and
the CPU is further configured to access the non-encryption data area of the memory device by using an address of the space corresponding to the non-encryption data area.

16. The computing system of claim 15, wherein the on-the-fly encryptor is further configured to convert the address of the pseudo secure memory address space into an address of the space corresponding to the encryption data area of the memory device by adding an offset address into the address of the pseudo secure memory address space.

17. The computing system of claim 12, wherein the memory controller comprises a scramble and descramble logic configured to scramble data to be stored in the non-encryption data area of the memory device and descramble data read from the non-encryption data area of the memory device.

18. The computing system of claim 12, wherein the CPU, the on-the-fly encryptor, and the memory controller are implemented with a system-on-chip (SoC).

19. The computing system of claim 12, wherein the on-the-fly encryptor is further configured to encrypt data from the CPU and decrypt data from the memory controller.

20. The computing system of claim 12, wherein the on-the-fly encryptor is a slave device for the CPU, and a master device for the memory controller.

* * * * *